US012172833B2

(12) United States Patent
Valinsky et al.

(10) Patent No.: US 12,172,833 B2
(45) Date of Patent: Dec. 24, 2024

(54) MATERIAL HANDLING SYSTEM WITH AUTOMATIC RETRIEVAL OF SORTED ITEMS

(71) Applicant: OPEX Corporation, Moorestown, NJ (US)

(72) Inventors: Joseph Valinsky, Moorestown, NJ (US); Alexander Stevens, Moorestown, NJ (US); Monty McVaugh, Moorestown, NJ (US)

(73) Assignee: OPEX Corporation, Moorestown, NJ (US)

( * ) Notice: Subject to any disclaimer, the term of this patent is extended or adjusted under 35 U.S.C. 154(b) by 327 days.

(21) Appl. No.: 17/679,079

(22) Filed: Feb. 23, 2022

(65) Prior Publication Data

US 2022/0324648 A1 Oct. 13, 2022

Related U.S. Application Data

(60) Provisional application No. 63/208,956, filed on Jun. 9, 2021, provisional application No. 63/152,842, filed on Feb. 23, 2021.

(51) Int. Cl.
*B65G 1/04* (2006.01)
*B65G 1/06* (2006.01)
*B65G 1/10* (2006.01)

(52) U.S. Cl.
CPC ......... *B65G 1/0492* (2013.01); *B65G 1/0421* (2013.01); *B65G 1/065* (2013.01); *B65G 1/10* (2013.01)

(58) Field of Classification Search
CPC .................................................. B65G 1/0492
See application file for complete search history.

(56) References Cited

U.S. PATENT DOCUMENTS

| 3,746,189 A | 7/1973 | Burch et al. |
| 3,800,963 A | 4/1974 | Holland |
| 4,492,504 A | 1/1985 | Hainsworth |
| (Continued) | | |

FOREIGN PATENT DOCUMENTS

| CN | 108706265 | 10/2018 |
| WO | 2019109644 | 6/2019 |

OTHER PUBLICATIONS

International Search Report for PCT/US22/17590 on May 18, 2022.

*Primary Examiner* — Jonathan Snelting
(74) *Attorney, Agent, or Firm* — Brian K. Dinicola

(57) ABSTRACT

A system may include a vehicle for delivering items and a moveable track that cooperates with the vehicle. The moveable track may cooperate with a storage system having storage locations for storing items. The vehicle may drive into the moveable track and lift the track using a vertical drive mechanism. The vehicle may include a horizontal drive system operable to drive the vehicle horizontally along the ground to carry the moveable track to a position adjacent the storage location. The vehicle may operate the vertical drive system to drop the moveable track adjacent the storage system. Additionally, the vehicle may operate the vertical drive to drive up the moveable track to an elevated position adjacent one of the storage locations in the storage system. The vehicle may include a transfer mechanism for transferring items between the vehicle and the storage location while the vehicle is in the elevated position.

19 Claims, 33 Drawing Sheets

(56) References Cited

U.S. PATENT DOCUMENTS

| | | | |
|---|---|---|---|
| 6,805,526 B2 | 10/2004 | Stefani | |
| 7,101,139 B1 | 9/2006 | Benedict | |
| 7,381,022 B1 | 6/2008 | King | |
| 7,861,844 B2 * | 1/2011 | Hayduchok | B65G 1/04 |
| | | | 198/370.1 |
| 7,931,431 B2 | 4/2011 | Benedict et al. | |
| 9,334,113 B2 | 5/2016 | Naylor | |
| 9,409,714 B2 | 8/2016 | Dibble | |
| 9,796,527 B1 * | 10/2017 | Kaukl | B65G 1/0492 |
| 10,800,606 B2 | 10/2020 | Lert, Jr. | |
| 10,850,959 B2 | 12/2020 | Goetz | |
| 10,913,641 B2 * | 2/2021 | Gravelle | B66F 9/122 |
| 11,104,516 B2 | 8/2021 | Li | |
| 11,208,264 B2 | 12/2021 | Moulin et al. | |
| 11,230,435 B1 | 1/2022 | Mehta et al. | |
| 11,254,504 B2 | 2/2022 | Stevens et al. | |
| 11,713,193 B2 * | 8/2023 | Valinsky | B65G 1/1378 |
| | | | 414/267 |
| 11,790,295 B1 * | 10/2023 | Theobald | B65G 1/10 |
| | | | 700/218 |
| 11,821,223 B2 * | 11/2023 | Rakhmatulin | E04G 5/00 |
| 2008/0131241 A1 | 6/2008 | King | |
| 2017/0267452 A1 | 9/2017 | Goren | |
| 2018/0127212 A1 | 5/2018 | Jarvis | |
| 2018/0148259 A1 | 5/2018 | Gravelle et al. | |
| 2018/0305122 A1 | 10/2018 | Moulin | |
| 2020/0307911 A1 | 10/2020 | Austrheim et al. | |
| 2021/0047112 A1 | 2/2021 | Stevens et al. | |
| 2022/0227579 A1 | 7/2022 | Wu et al. | |

\* cited by examiner

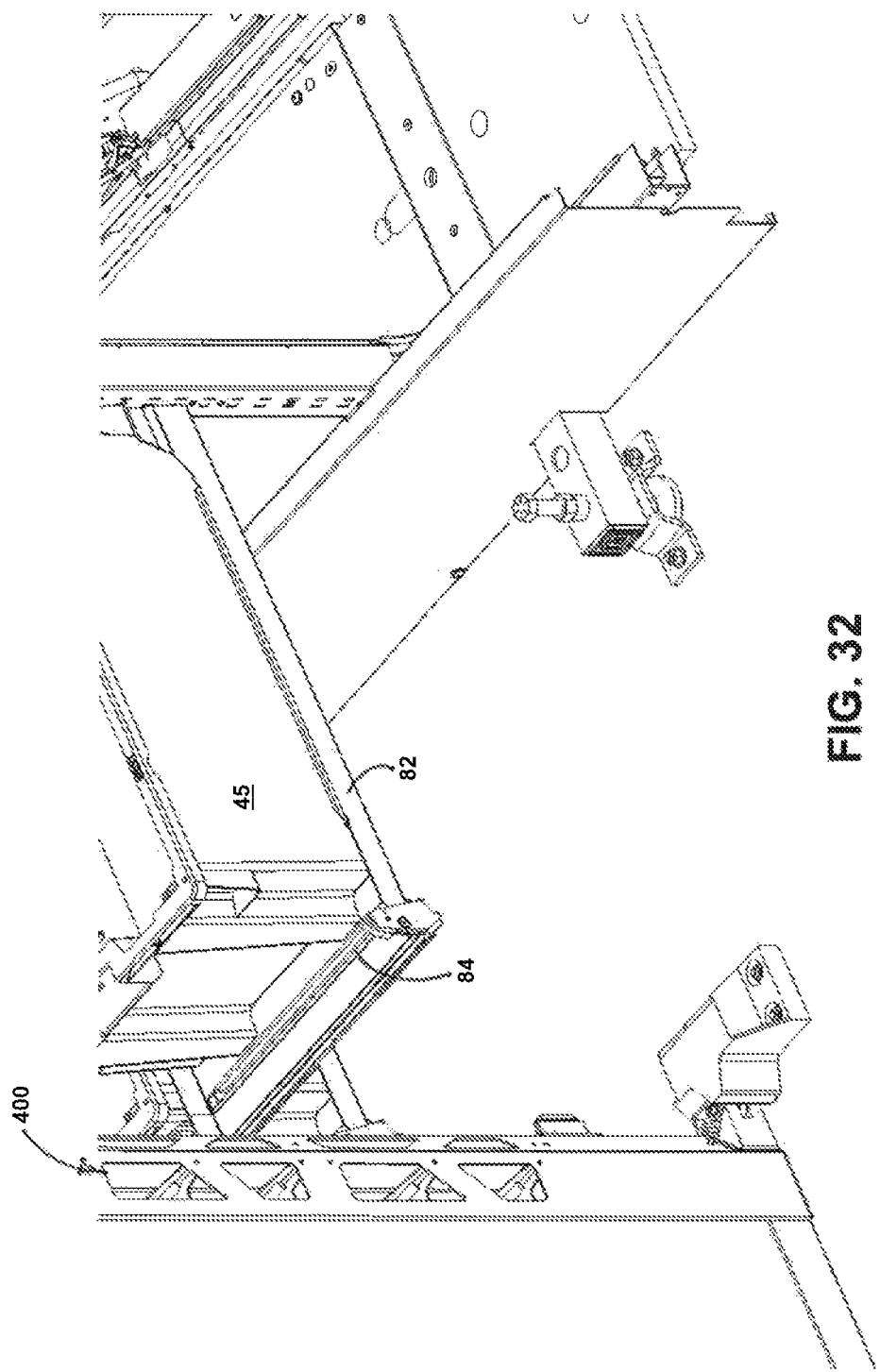

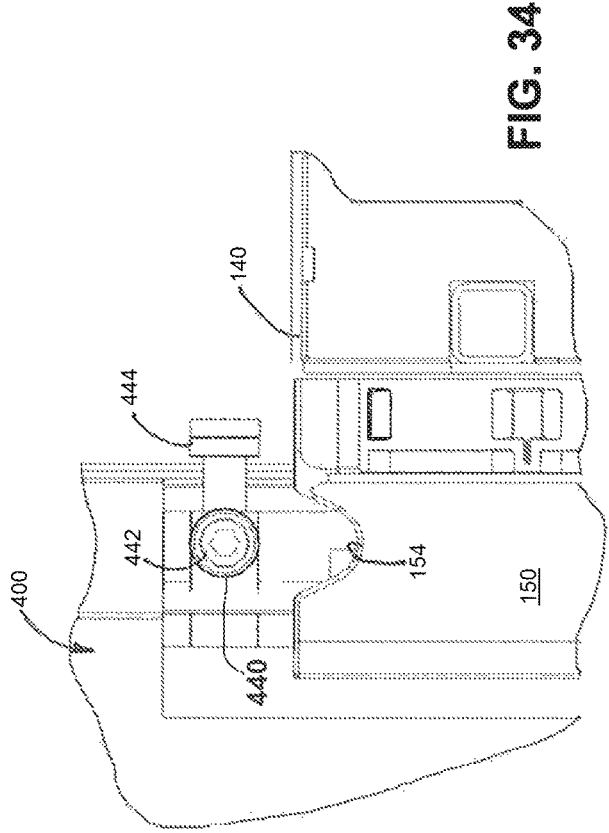
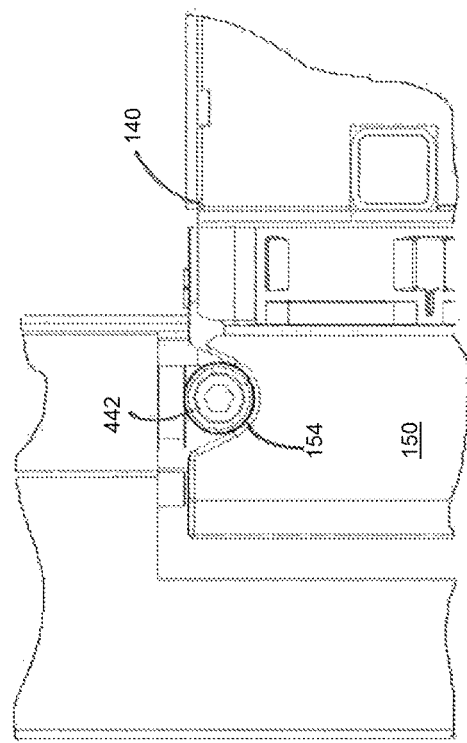
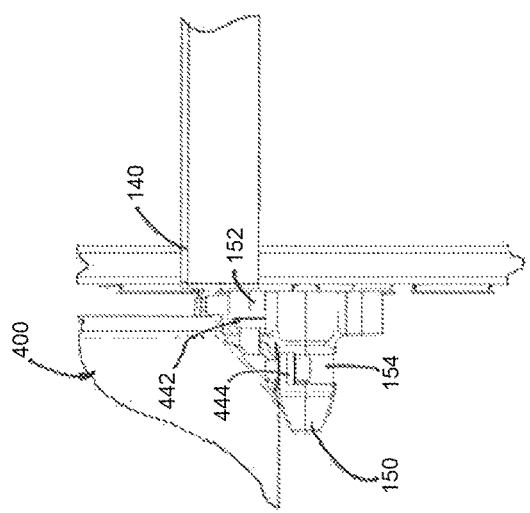
FIG. 34
FIG. 35
FIG. 33

MATERIAL HANDLING SYSTEM WITH AUTOMATIC RETRIEVAL OF SORTED ITEMS

PRIORITY CLAIM

This application claims priority under 35 U.S.C. § 119 to U.S. Provisional Patent Application No. 63/152,842 filed on Feb. 23, 2021 and U.S. Provisional Patent Application No. 63/208,956 filed on Jun. 9, 2021. The entire disclosure of each of the foregoing applications is hereby incorporated herein by reference.

FIELD OF THE INVENTION

Embodiments of the present invention generally relate to automated material and article handling systems which can be used in warehouse, storage and/or distribution environments

BACKGROUND

Sorting and retrieving items to fill orders can be laborious and time consuming. Many large organizations have extensive storage areas in which numerous items are stored. Sorting and retrieving items from the hundreds or thousands of storage areas requires significant labor to perform manually. In many fields, automated picking has developed to reduce labor cost and improve customer service by reducing the time it takes to fill a customer order. However, the known systems of automatically handling the materials can be very expensive or have limitations that hamper their effectiveness. Accordingly, there is a need in a variety of material handling applications for automatically storing and/or retrieving items. Additionally, once items for an order are sorted into a bin or other container, it would be desirable to have a system for automatically removing the container with the completed order and transferring the container to a separate location.

SUMMARY OF THE INVENTION

In view of the shortcomings of the known systems, the present invention provides a system for automatically retrieving groups of items that have been sorted by a sortation system.

The present invention also provides an apparatus and method for identifying bins in a sorting system to be shaken to settle the contents and a system for automatically shaking the identified bins to settle the contents in the bin.

The present invention also provides a material handling system including a storage assembly having a plurality of bins in a plurality of storage locations and a controller for identifying when one of the bins is full. The system further includes a retrieval system configured to retrieve a full bin from the storage location and transfer the bin away from the storage location. The retrieval system includes transfer means configured to transfer the bin onto the retrieval system from the storage location.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 32 is an enlarged fragmentary perspective view of the material handling system illustrated in FIG. 1B;

FIG. 33 is an enlarged fragmentary plan view of a connection between the sorting system illustrated in FIG. 6 and the retrieval system illustrated in FIG. 16;

FIG. 34 is an enlarged fragmentary side view of the connection illustrated in FIG. 33 illustrated in detached position;

FIG. 35 is an enlarged fragmentary side view of the connection illustrated in FIG. 34 in a connected position;

Figure 1A:
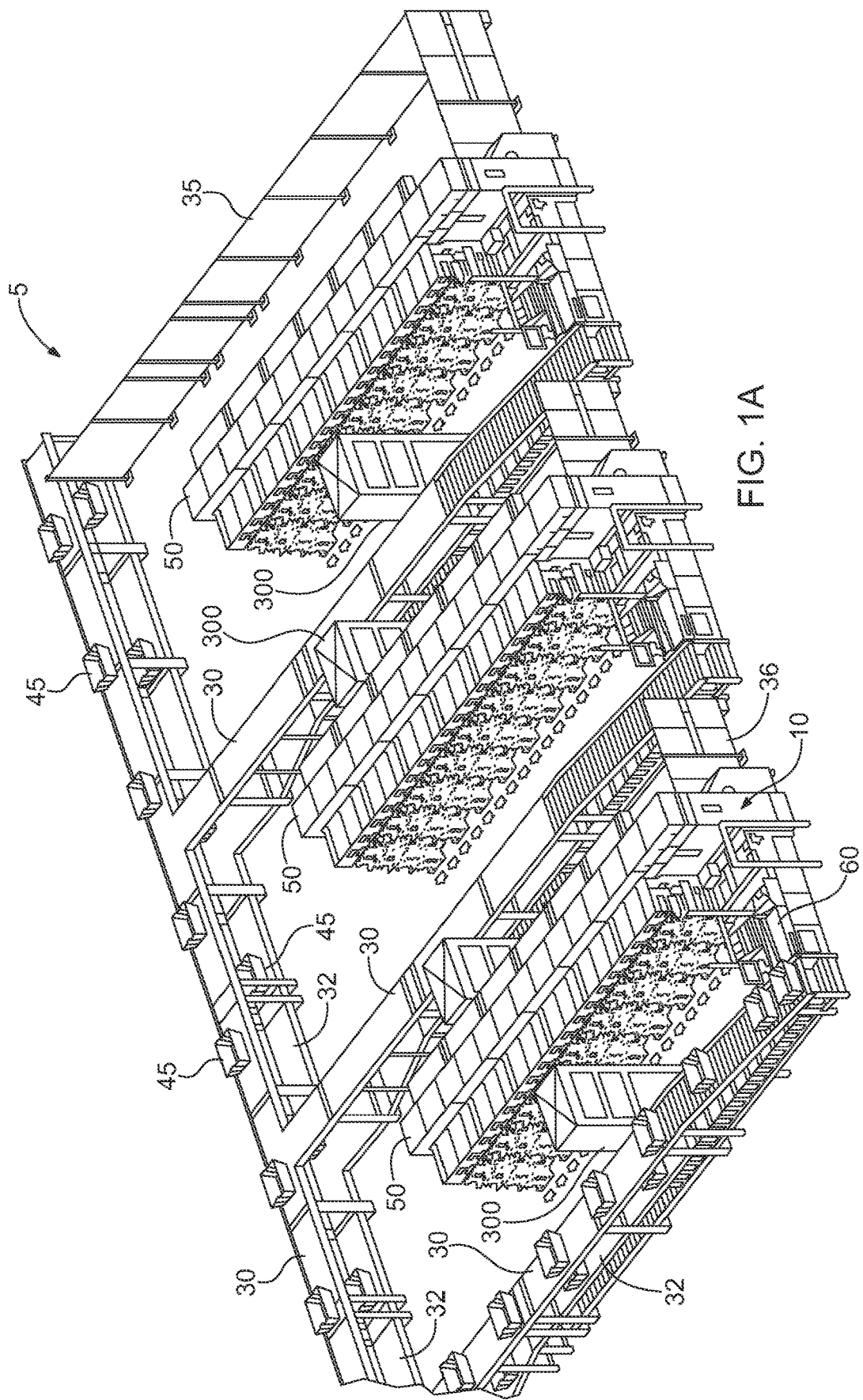
FIG. 1A is a perspective view of a warehouse automation system.

While the systems and methods are described herein by way of example for several embodiments and illustrative drawings, those skilled in the art will recognize that systems and methods for performing respective subsets of inventory management tasks using corresponding functional accessory modules are not limited to the embodiments or drawings described. It should be understood that the drawings and detailed description thereto are not intended to limit embodiments to the particular form disclosed. Rather, the intention is to cover all modifications, equivalents and alternatives falling within the spirit and scope of the systems and methods for performing respective subsets of inventory management tasks using corresponding functional accessory modules defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for performing inventory management tasks in an inventory management system are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like may include a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference will now be made in detail to exemplary embodiments of the present invention, examples of which are illustrated in the accompanying drawings. Wherever possible, the same reference numbers will be used throughout the drawings to refer to the same or like parts.

Figure 1B:
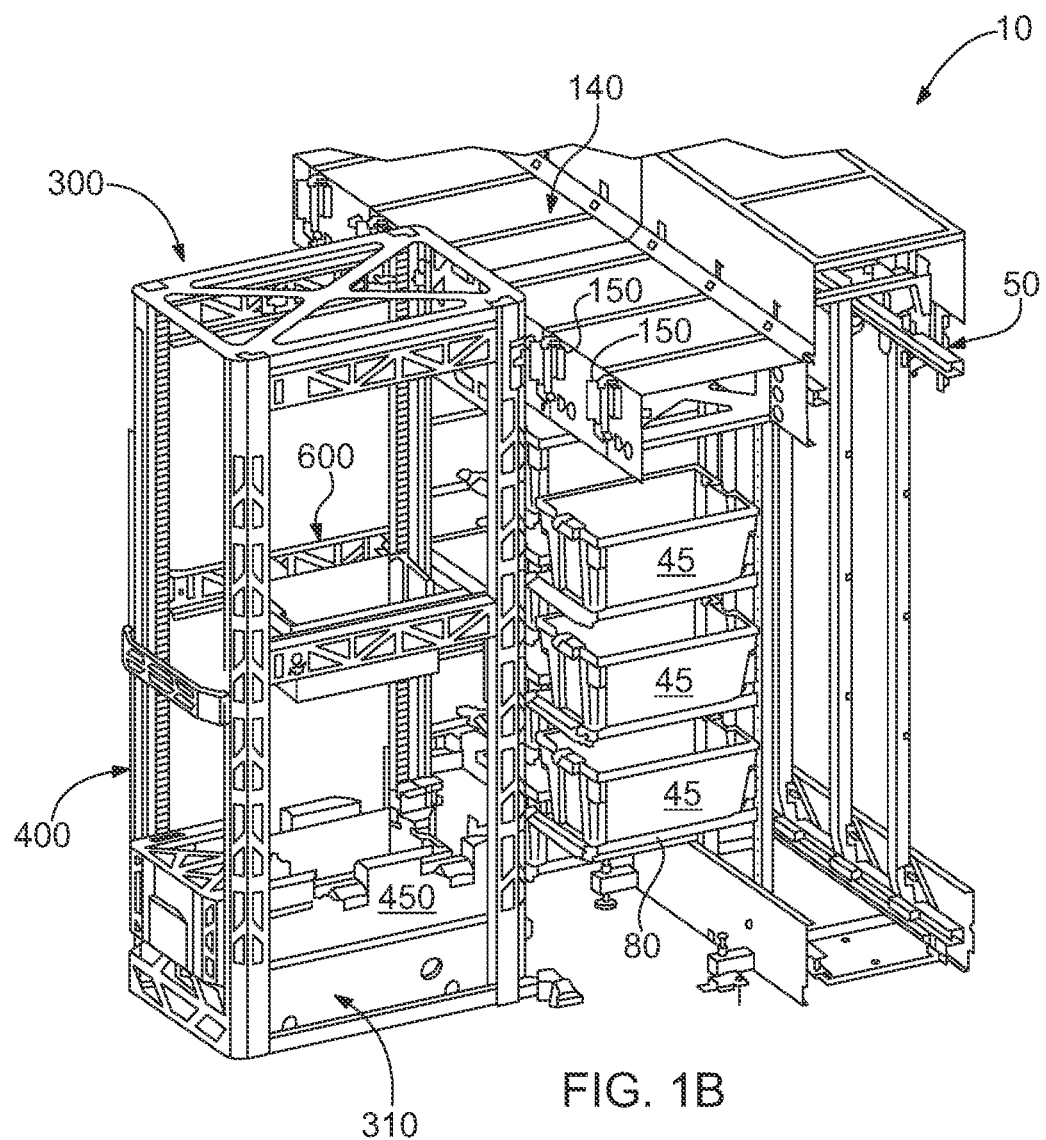
FIG. 1B is a fragmentary perspective view of a material handling system.
Figure 2:
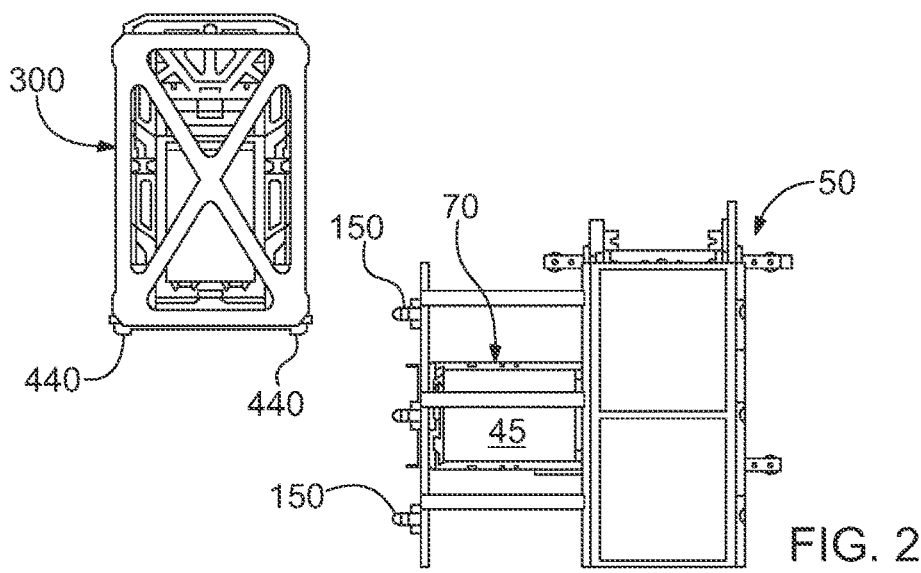
FIG. 2 is a plan view of the material handling system illustrated in FIG. 1B with an automated retrieval system in a first position.
Figure 3:
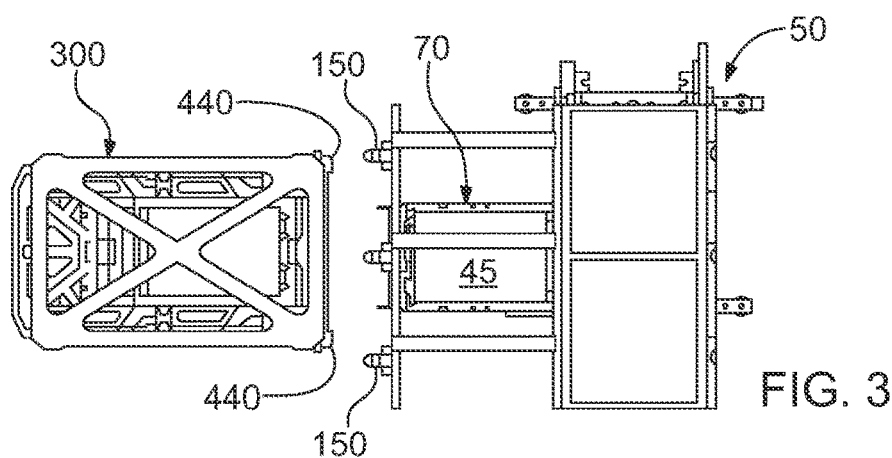
FIG. 3 is a plan view of the material handling system illustrated in FIG. 2 with the automated retrieval system in a second position.
Figure 4:
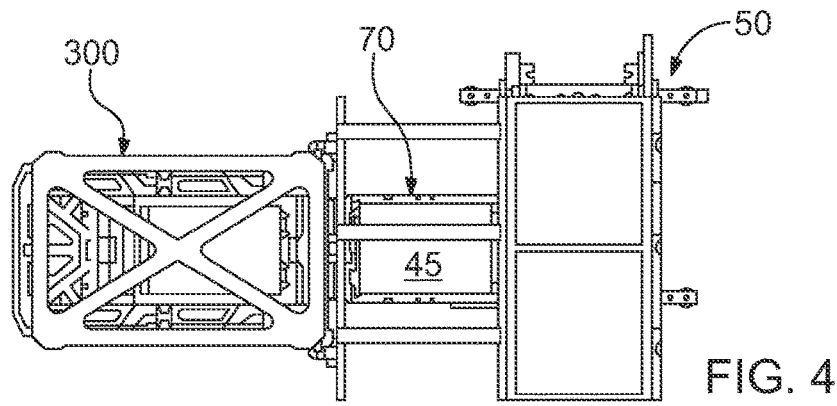
FIG. 4 is a plan view of the material handling system illustrated in FIG. 2 with the automated retrieval system in a third position.

Referring now to the figures in general and to FIGS. 1A-1B specifically, a material handling apparatus is designated generally 10. The apparatus 10 is configured to sort items into separate groupings and to retrieve the items once a grouping is completed. The apparatus 10 optionally includes a sortation system 50 for sorting items to a plurality of locations, such as a plurality of bins 45. The apparatus also includes a retrieval system 300 for automatically retrieving a bin from a storage location 80 of the sortation system once items have been sorted to the bin. Optionally, the retrieval system 300 may also be configured to replace the full bin with an empty bin at the storage location. Additionally, the retrieval system 300 may be configured to convey the full bin to a workstation or conveyor system so that the full bin can be further processed, such as by being prepared for shipment.

The apparatus 10 may be incorporated into an overall warehouse automation system 5, which may include one or more systems 10 for sorting and retrieving items. The system 5 may include an input conveyor system 30 for feeing bins 45 to each apparatus 10. For instance, the input conveyor may convey bins of items to be sorted to an input station of the sortation system 50. Additionally, the system 5 may include an output conveyor 32 for conveying bins away from the sortation systems after the bins have been filled with sorted items. In particular, each sortation apparatus 10 may include a retrieval system 300 that can transfer bins 45 from the sortation system 50 to the output conveyor so that completed bins with sorted items can be conveyed to a separate area, such as an area for preparing the sorted items for shipping.

The system 5 may include a containment barrier 35 surrounding the area that includes the sortation systems 50 and the retrieval systems 300. The barrier may be designed to impede entry of human operators into the area where the retrieval systems 300 operate. Additionally, the barrier 35 may include one or more service entrances, such as doorways 36. The doorways may include sensors that provide a signal if the door is opened. In response to a signal indicating that one of the doors 36 is open, the system may control one or more elements, such as the retrieval system(s) 300 to prevent operation of the retrieval systems.

Although the sorting and retrieving apparatus 10 is illustrated as part of an overall material handling system 5, it should be understood that such an embodiment is provided to illustrate an exemplary embodiment. Accordingly, it should be understood that various features, such as the input and output conveyors 30, 32 and the barrier 35 are not necessary to the operation of the system.

The system 10 and/or various components of the system, such as the sortation system 50 and the retrieval system 300, may be controlled by a central controller 20, such as a microcomputer. The central computer may receive signals from various elements, such as sensors and control various aspects of the system based on signals received from the various components. Based on the signals received from the sortation system and the retrieval system, the central controller provides control signals to control various aspects of the sortation system and the retrieval system as discussed further below. The central controller may also store data regarding the location of various items to be retrieved from the system. Additionally, the central controller may include data regarding the identification of items to be retrieved, such as a number of items to fill customer orders, as well as the quantify of such items. In this way, the central controller may control and coordinate the operation of various elements to schedule the retrieval and processing of a variety of items from the storage locations.

The central controller may also communicate with a warehouse management system (WMS), which may provide information regarding the items to be processed, such as the items included in various orders, the sequence of the orders and other such parameters. The central controller may control the various aspects of the system based on data received from the WMS.

The optional sortation system 50 may be any of a variety of system configured to sort items into a variety of containers, such as bins 45. In the illustrated example, the sortation system 50 incorporates a plurality of delivery vehicles that follow a track 100 to deliver items in the bins. Each bin may accumulate a plurality of items delivered by a plurality of delivery vehicles. The sortation system 50 includes a plurality of bins 45. The bins may be configured in any of a variety of configurations. For instance, in the illustrated embodiment, the bins are arranged into a plurality of columns or rows.

The retrieval system 300 is configured to retrieve bins 45 from the sortation system 50 once each bin is full. It should be understood that a bin may be considered full even if the bin is not completely full physically (i.e. there is still some empty space in the bin). Instead, the system may deem a bin to be full once the bin reaches a threshold deemed by the system to be physically full. Additionally, the system may deem a bin to be full once all of the items for an order have been delivered to the bin. For example, if an order requires ten items and all tens items have been delivered to the bin, then the bin may be deemed to be full regardless of how much empty space remains in the bin. Accordingly, once a signal is received indicating that a bin 45 in the sortation system is full, the central controller controls the retrieval system to retrieve the full bin from the sortation system. Once retrieved, the retrieval system transports the full bin to an input/output area, such as a workstation or conveyor. Optionally, the retrieval system delivers an empty bin to the storage location from which the full bin was removed.

As illustrated in FIGS. 1-5 and discussed further below, the retrieval system 300 may include a moveable track 400 and a vehicle 310 configured to move the track. The vehicle 310 is configured to lift the track 400 and move the track to align the track with the full bin 45. The vehicle 310 may then climb the track 400 and transfer the full bin onto the vehicle. The vehicle may then descend the track and drive the full bin to the input/output station where the full bin may be transferred to the input/output station. Optionally, the retrieval system may be configured so that the vehicle lifts the moveable track 400 while carrying the full bin so that the vehicle can transport the track and the full bin to the input/output station. At the input/output station the vehicle can then lower the track onto the ground and climb the track to raise the full bin to a delivery location. Once raised to the delivery location, the vehicle may be configured to transfer the full bin onto the delivery location. After delivering the full bin to the input/output station, the vehicle may descend to drive the track back to the sortation system to retrieve another full bin.

Optionally, the retrieval system 300 may be configured to store one or more bins 45 so that the system may retrieve a plurality of bins and transport the plurality of bins to the input/output station at the same time. Similarly, the system may store a plurality of empty bins so that a plurality of empty bins can be delivered to a plurality of empty storage locations in the sortation system.

It should be understood that various items and subassemblies of the overall system can be used alone or in combination with material handling systems having different structure or operation to the system illustrated in the Figures and described below.

Sortation System

The system may include a sortation system for sorting items. The sortation system 50 may take any number of forms that incorporate a plurality of storage locations. For instance, the system may use one or more sorting elements such as vehicles, moveable arms or other automated elements. Whatever sortation device is used the items are delivered to a series of output containers, such as bins.

Throughout this description, the term bin should be understood to encompass any type of container that can contain one or more items. Preferably, the bins are configured to accommodate a variety of items so that a plurality of items can be accumulated in the bin. For instance, preferably the bins include an opening so that items can dropped or ejected into the bin from the sorting element.

The bins may be located and positioned in any of a variety of configurations. However, preferably the bins are configured in a grid or array of bins. For instance, the bins may be organized into a plurality of columns or rows.

The following system describes the details of an exemplary sorting station. However, it should be understood that this is merely an exemplary sortation system. The details of the sortation system are optional features that may be modified or eliminated depending on the needs for the particular application.

Referring to FIGS. 6-9 the details of an exemplary sortation system are shown in detail. The sortation system includes a pair of spaced apart storage racks 70, 72 with an aisle 35 formed between the storage racks. A plurality of automated sortation vehicles 200 may operate within the aisle 35. In particular, the sortation vehicles 200 may travel along a track 100 that is positioned in the aisle, as described further below.

In the exemplary system illustrated in FIGS. 6-9, the sortation system includes an optional station for feeding items. This feeding station is referred to as the induction station 60. The induction station 60 may determine an identifying characteristic for the items to be fed into the system. The identifying characteristic can be any of a variety of characteristics, such as a product number or UPC code. The identifying characteristic can be determined manually, such as by an operator. However, in the present instance, the induction station includes a scanning station 62 that may include a plurality of scanners, such as optical scanners in the form of a bar code scanner, digital camera or otherwise. The induction station may include a conveyor for conveying the items past the scanner or the operator may manually scan the items before they are fed into the system.

The induction station 60 optionally includes a conveyor such as a conveyor belt or a plurality of rollers for serially conveying items to a loading station where the items are loaded onto vehicles 200. A plurality of items may be loaded onto each vehicle. However, in the present instance, each item is loaded onto a separate vehicle and the vehicle then delivers the item to one of the storage locations.

Although the configuration of the induction station 60 may vary, details of an exemplary induction station are provided in U.S. Pat. No. 10,494,192. The entire description of U.S. Pat. No. 10,494,192 is hereby incorporated herein by reference. Additionally, it should be noted that the induction station 60 is not a necessary element and that aspects of the invention can be utilized in a system that does not include an induction station.

Referring again to FIGS. 6-7, the details of the sortation system will be described in greater detail. The system includes a plurality of storage locations 80 for storing items so that the items may be retrieved. In one configuration, the items are delivered to the storage locations by a plurality of automated vehicles 200. The storage locations may be used to accumulate items so that an automated retrieval device can retrieve the items from the storage location. For instance, a storage bin 45 may be located in each storage location 80 and the system may deliver items to the different storage bins to fulfill customer orders. Once the system has delivered all of the items to a particular storage bin that are required for an order, the storage bin 45 may be removed from the storage location 80 and replaced with an empty storage bin as discussed further below.

The storage locations may be arranged in any of a variety of orientations. For instance, referring to FIGS. 6-7, the sortation system may include two opposing racks, a front rack 70 and a rear rack 72. The racks 70, 72 are spaced apart from one another, forming an aisle 75 between the racks. Optionally, the racks 70, 72 may be connected by a plurality of cross brackets that interconnect the racks. In particular, a plurality of top cross brackets may extend between the tops of the racks and a plurality of cross braces may extend between the bottoms of the racks thereby connecting the racks and maintain the racks spaced apart to provide the aisle 75.

The track 100 may follow any of a variety of configurations depending upon the application. One exemplary embodiment is illustrated in the FIG. 8, which includes a closed loop having a plurality of columns. Similarly, the system may be configured as a series of rows connected by vertical tracks. Additionally, the system may be an open track rather than a closed loop. Therefore, it should be understood that the loop configuration illustrated in the figures is only one example and that the track may take any of a variety of forms.

Figure 8:
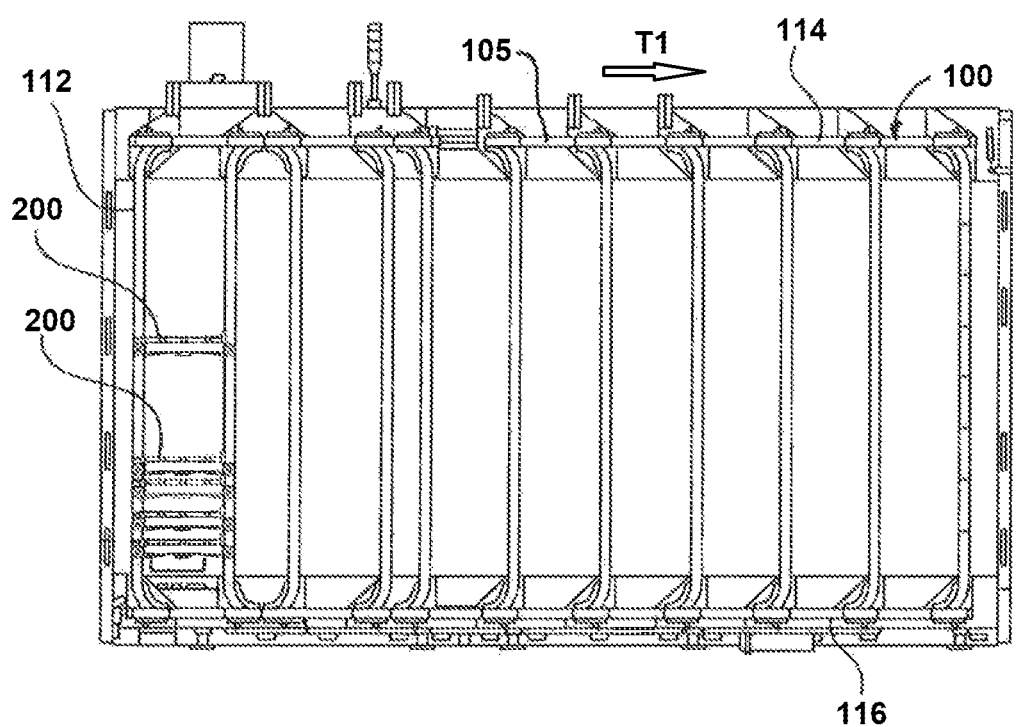
FIG. 8 is a fragmentary side view of the sortation system illustrated in FIG. 6.

As shown in FIG. 8, the track 100 optionally includes a horizontal upper rail 114 and a horizontal lower rail 116. A plurality of vertical legs 112 extend between the upper horizontal leg 114 and the lower horizontal leg 116. During transport, the vehicles travel up a pair of vertical legs from the loading station to the upper rail 114. The vehicle then travels along the upper rail 114 in the direction of travel identified by arrow $T_1$ until reaching the column having the appropriate bin or destination. The vehicle then travels downwardly along two front vertical posts and two parallel rear posts until reaching the appropriate bin or destination, and then discharges the item into the bin or destination area. The vehicle then continues down the vertical legs until reaching the lower horizontal leg 116. The vehicle then follows the lower rail back toward the loading station.

Figure 6:
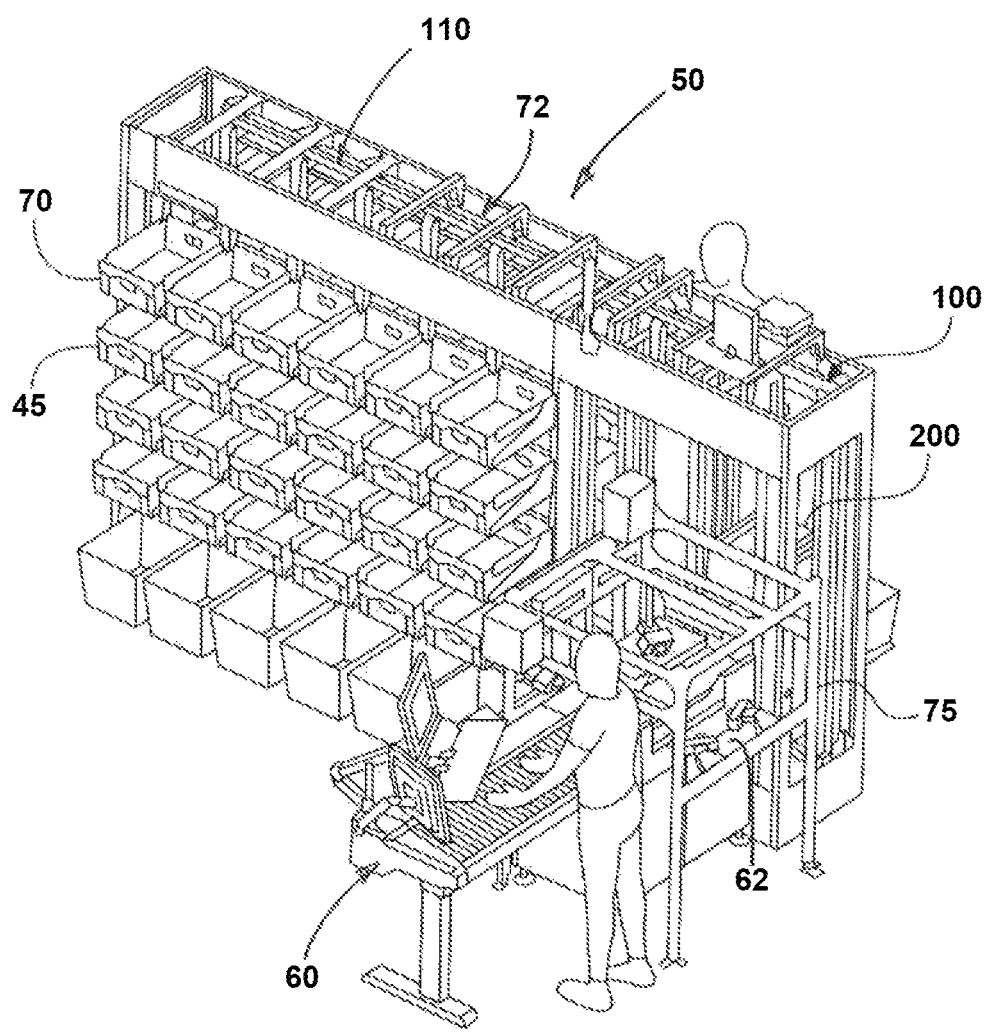
FIG. 6 is a perspective view of a sortation system of the material handling system illustrated in FIG. 1B.
Figure 7:
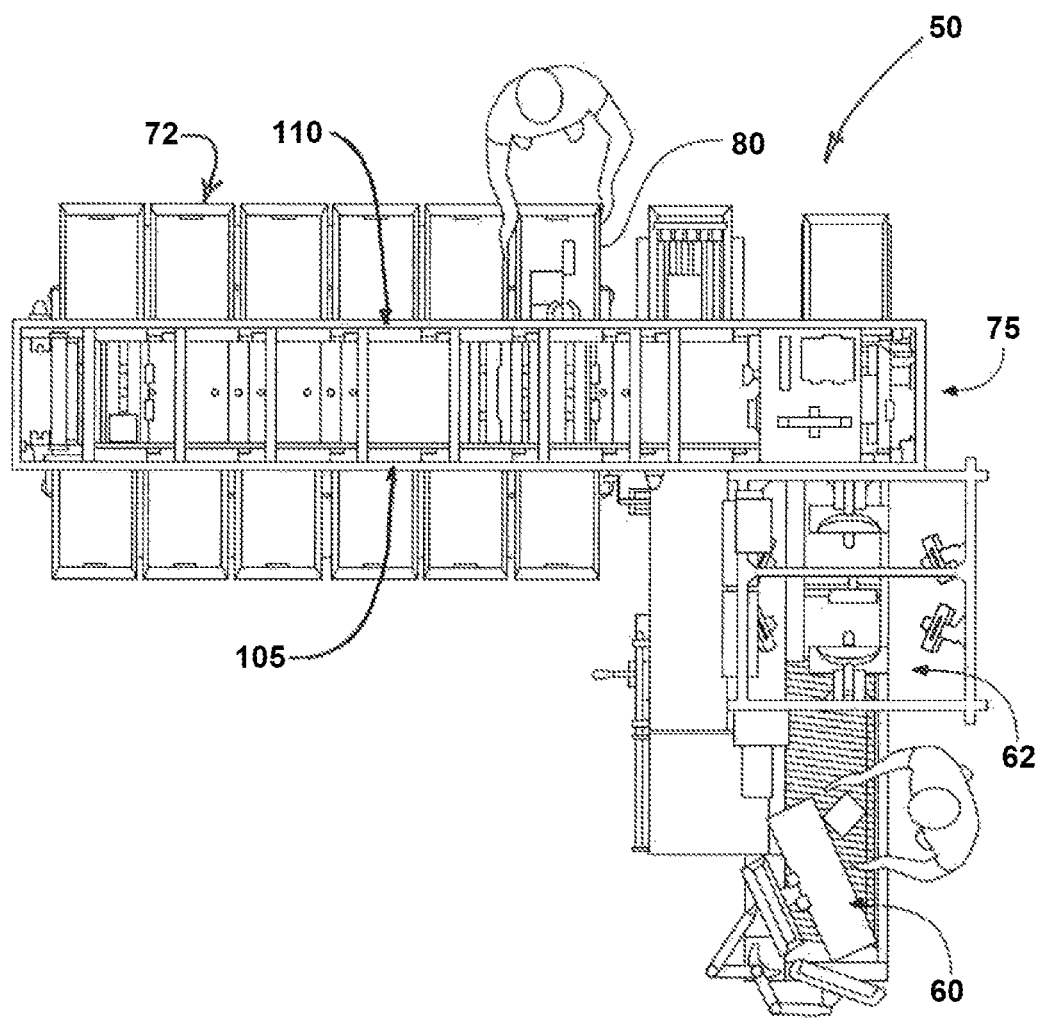
FIG. 7 is a plan view of the sortation system illustrated in FIG. 6.

Referring to FIGS. 6-7, the track 100 includes a front track 105 and a rear track 110. The front and rear tracks 105, 110 are parallel tracks that cooperate to guide the vehicles around the track. In the discussion of the track, the front and rear tracks 105, 110 are similarly configured opposing tracks that support the forward and rearward wheels 220 of the vehicles. In particular, in the present embodiment the rear track 110 is mirror of the front track 105. Accordingly, a description of a portion of either the front or rear track also applies to the opposing front or rear track, except as stated otherwise below.

The details of the track may be substantially similar to the track as described in U.S. Pat. No. 7,861,844. The entire disclosure of U.S. Pat. No. 7,861,844 is hereby incorporated herein by reference.

Figure 9:
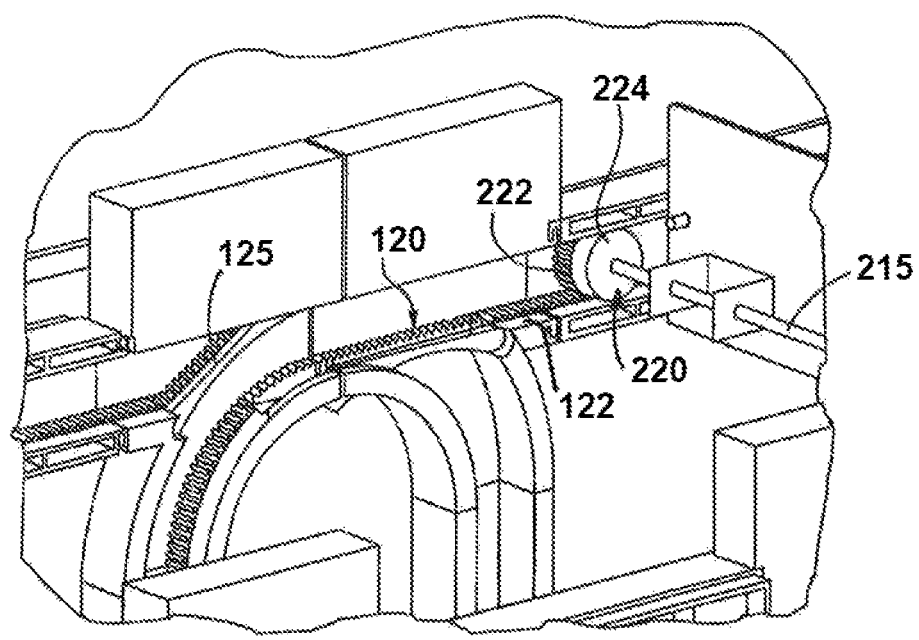
FIG. 9 is an enlarged fragmentary perspective view of the sortation system illustrated in FIG. 6.

Referring to FIG. 9, the track 100 includes a drive surface 120 that positively engages the cars to enable the car to travel along the track. The drive surface 120 may be any of a variety of configurations that engage drive elements on the vehicles. In particular the drive surface may be configured to mate with or mesh with drive elements on the vehicles. One such example of a drive surface 120 is a series of teeth, forming a rack that engages the wheels of the cars as described further below. Similarly, the track may include a series of recesses or detents that cooperate with corresponding elements, such as a sprocket or other element that projects from the wheels. In this way, the term "positively engaging" refers to engagement between the drive surface 120 and drive elements of the vehicle 200 that impedes the drive elements from sliding along the track 100.

Optionally, the track may also include a guide surface 122 in the form of a generally flat surface adjacent the drive surface 120. For example, the drive surface 120 may extend approximately halfway across the track and the guide surface 122 may extend across the other half of the track. As shown in FIG. 9, the drive surface 120 may be formed on an inner wall of the track and the opposing outer wall may be a generally flat surface parallel to the guide surface 122 of the inner wall.

As described above, the track may include a plurality of vertical legs 112 extending between the horizontal upper and lower rails 114, 116. An intersection may be formed at each section of the track at which one of the vertical legs intersects one of the horizontal legs. For instance, each intersection may include a pivotable gate 125 having a smooth curved inner race and a flat outer race that has drive surfaces that correspond to the drive surfaces 120 of the track. The gate 125 may pivot between a first position and a second position. In the first position, the gate 125 may be closed so that the straight outer race of the gate is aligned with the straight outer branch of the intersection. In the second position, the gate 125 may be open so that the curved inner race of the gate is aligned with the curved branch of the intersection.

A central controller 20 is configured to control operation of the gates 125 in response to the locations of each vehicle 200 and the path along which each vehicle is to travel. Specifically, the central controller is configured to provide signals for each gate to actuate the gate to either the open or closed position.

Sortation Vehicles

Figure 10:
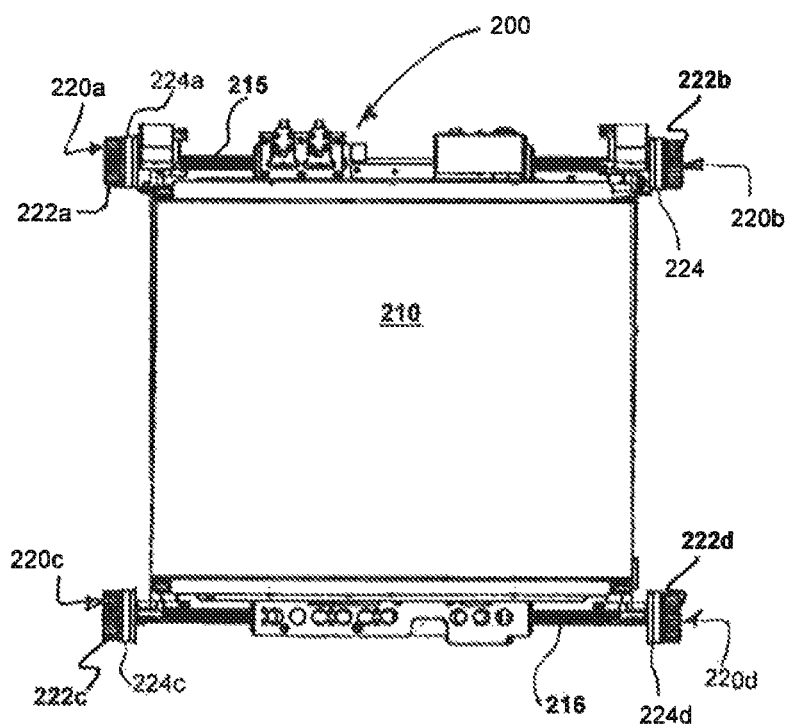
FIG. 10 is a plan view of a sortation vehicle of the sortation system illustrated in FIG. 6.
Figure 11:
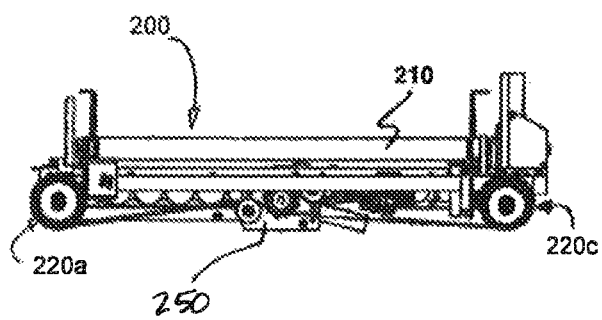
FIG. 11 is a side elevational view of the sortation vehicle illustrated in FIG. 10.

As noted above, the system may include any of a variety of sortation elements. One exemplary system described herein utilizes one or more sortation vehicles 200. Referring to FIGS. 10-11, the details of the sortation vehicle 200 will be described in greater detail. Each sortation vehicle 200 may be a semi-autonomous vehicle having an onboard drive system, including an onboard power supply. Each vehicle optionally includes a mechanism for loading and unloading items for delivery. An exemplary vehicle is illustrated and described in U.S. Pat. No. 7,861,844, the entire disclosure of which is incorporated herein by reference.

As discussed further below in detail, the vehicle includes a mechanism for driving the vehicle 200 along the track 100. The drive mechanism may include any of a variety of elements. In the present instance, the drive mechanism includes a plurality of wheels 220 that engage the track 100.

Additionally, the vehicle 200 optionally incorporates a mechanism for loading an item onto the vehicle and discharging the item from the vehicle into one of the bins. The loading/unloading mechanism 210 may be specifically tailored for a particular application. For example, the sortation vehicle 200 may include a platform onto which an item may be placed. The platform 210 may be a stationary platform and the system may include elements operable to load items onto the platform and unload items from the platform. Alternatively, the platform may be moveable. For instance, the platform may be one or more horizontal belts. The belts may be selectively operable to convey an item onto the vehicle. Similarly, the belts may be selectively operable to discharge items from the belt. In the present instance, the loading/unloading mechanism 210 is illustrated as one or more conveyor belts that extend along the top surface of the vehicle. The conveyor belts are reversible. Driving the belts in a first direction displaces the item toward the rearward end of the vehicle; driving the belt in a second direction displaces the item toward the forward end of the vehicle.

The vehicle may include a conveyor motor mounted on the underside of the vehicle to drive the conveyor belts. The conveyor belts may be entrained around a forward roller at the forward edge of the vehicle, and a rearward roller at the rearward edge of the vehicle. The conveyor motor may be connected with the forward roller to drive the forward roller, thereby operating the conveyor belts.

The vehicle 200 may include a plurality of wheels. As shown in FIGS. 10-11, each of the vehicles may include four wheels 220: two forward wheels and two rearward wheels. The terms forward and rearward refer to the track in which the wheels ride as opposed to the direction of travel for the vehicle. Specifically, the forward wheels ride in the front track 105, while the rearward wheels ride in the rear track 110.

The wheels 220 are mounted onto two parallel spaced apart axles 215, 216 so that two of the wheels are disposed along the forward edge of the vehicle and two of the wheels are disposed along the rearward edge of the vehicle. Specifically, wheels 220a and 220b are mounted on leading axle 215, whereas wheels 220c and 220d are mounted on trailing axle 216. Axle 215 is referred to as the leading axle because when moving in a horizontal direction, the vehicle typically moves in a direction in which axle 215 is leading and axle 216 is trailing. However, it should be understood that the vehicle may be reversed so that axle 216 becomes the leading axle and axle 215 becomes the trailing axle. Accordingly, it should be understood that the terms leading and trailing do not imply a requirement or limitation on the orientation of the vehicle and its direction of travel.

Each wheel 220 may comprise a drive element 222 that cooperates with a drive surface of the track. The drive elements may be any of a variety of elements configured to mate with the drive surfaces 120 of the track. For example, the drive elements may be rotatable elements such as cogwheels or sprockets. In the present instance, the drive elements 222 are gears, such as pinion gears having a plurality of teeth.

Each wheel optionally includes a guide element in addition to the drive element 222. The guide element guides the wheel along areas of the track in which the track transitions from one direction to another direction. The guide element may also carry some of the load of the vehicle. According to one embodiment, the guide element may be a roller such as an idler roller 224. The roller 224 may be coaxially with and positioned next to the drive element 222. The idler roller 224 may engage the track to roll along the track while the drive element 222 engages the drive surface 120 to drive the vehicle along the track.

Optionally, the drive elements of the vehicle are configured so that a first drive element on the first axle engages the front track and a second drive element of the first axle engages the rear track. Similarly, a first drive element on the second axle engages the front track and a second drive element on the second axle engages the rear track. In this way, two spaced apart drive elements, such as gears, engage the front track 105 and two spaced apart drive elements, such as gears, engage the rear track 110.

The vehicle includes an onboard motor for driving the wheels 220. More specifically, the drive motor is operatively connected with the axles to rotate the axles 215, 216 which in turn rotate the gears 222 of the wheels.

The vehicle 200 may be powered by an external power supply, such as a contact along the rail that provides the electric power needed to drive the vehicle. However, in the present instance, the vehicle includes an onboard power source that provides the requisite power for both the drive motor and the conveyor motor. Additionally, in the present instance, the power supply is rechargeable. Although the power supply may include a power source, such as a rechargeable battery, in the present instance, the power supply is made up of one or more ultracapacitors.

The central controller 20 may control operation of the sortation vehicles 200 to direct the vehicles to an appropriate bin 45. Specifically, the central controller is configured to receive data from a variety of sensors along the track and on the vehicles in addition to data received regarding the appropriate bin to which an item is to be delivered. Based on the data received by the central controller, the central controller directs the vehicle to the appropriate bin. At the appropriate bin 45, the vehicle discharges an item into the bin. The central controller may provide a variety of control signals to control the vehicle. For instance, the central controller may provide control signals to actuate the gates to direct the path that the vehicle follows. Additionally, the central controller may provide signals to selectively advance the vehicle based on the location of other vehicle in the system.

Retrieval Vehicles

FIGS. 12-15 illustrate details of one of a retrieval vehicle 310 that can be incorporated into the retrieval system 300. As noted above, if the system incorporates vehicles, the structure of the vehicle may vary. Accordingly, it should be understood that each of the features of the vehicle 310 that are discussed below are optional features that may be varied or eliminated depending on the application.

The retrieval vehicles 310 may be autonomous systems that include an onboard power supply for driving the vehicle. The vehicles may also include a communication system for wirelessly receiving and transmitting control signals between each vehicle and a control element, such as the central controller 20. In this way, the vehicle may receive control signals regarding the location for retrieving an item and the location to which the vehicle is to deliver the item.

Figure 12:
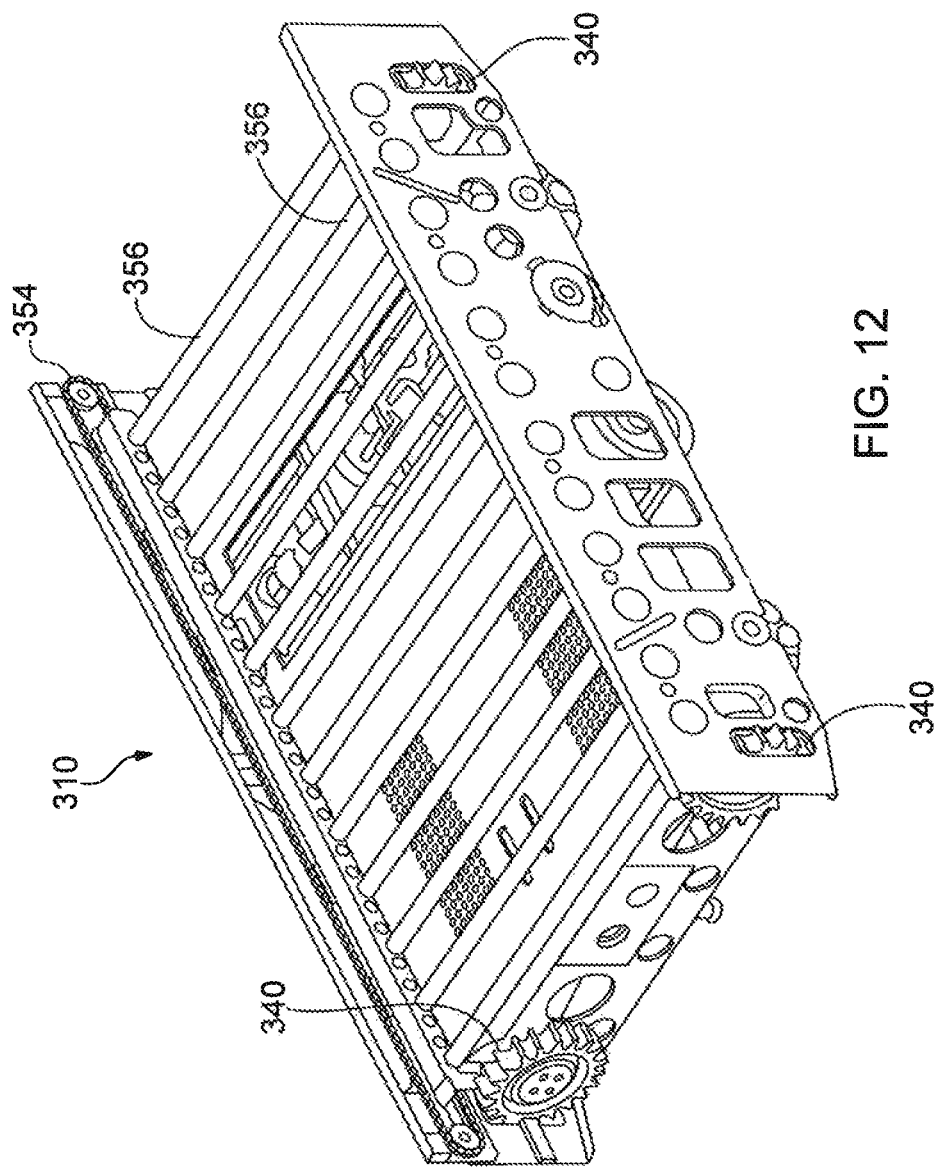
FIG. 12 is a perspective view of a retrieval vehicle of a retrieval system of the material handling system illustrated in FIG. 1B.

The vehicle illustrated in FIG. 12 includes a horizontal drive assembly 320 for driving the retrieval vehicle 310 in a horizontal direction. The horizontal drive 320 may be configured to drive the vehicle along a track or along an open horizontal surface, such as a floor. For instance, one option for a horizontal drive includes a plurality of rotatable elements, such as wheels or rollers. One or more drive mechanisms may be provided for turning the rotatable elements. Additionally, the rotatable elements may turn from side to side to steer the vehicle.

Figure 13:
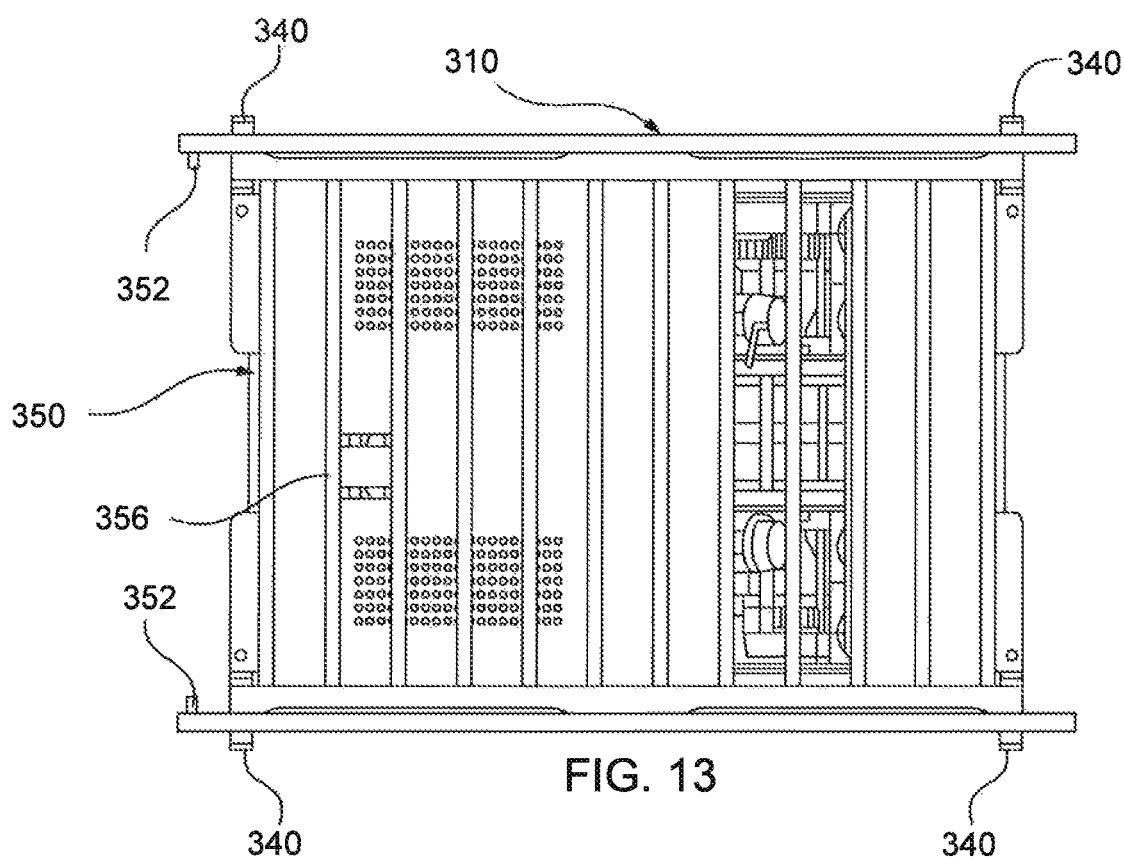
FIG. 13 is a plan view of the retrieval vehicle illustrated in FIG. 12.
Figure 14:
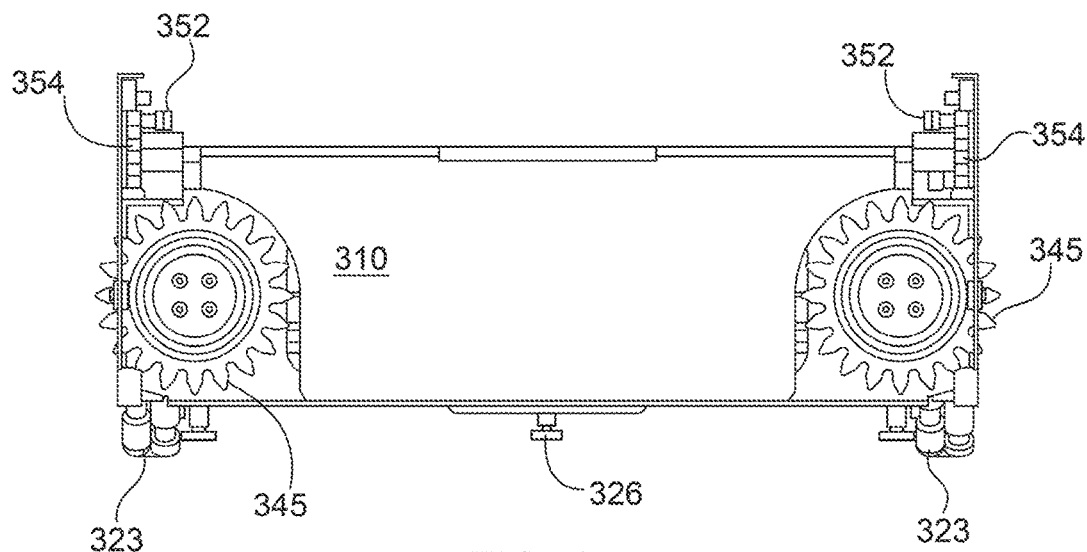
FIG. 14 is an end view of the retrieval vehicle illustrated in FIG. 12.
Figure 15:
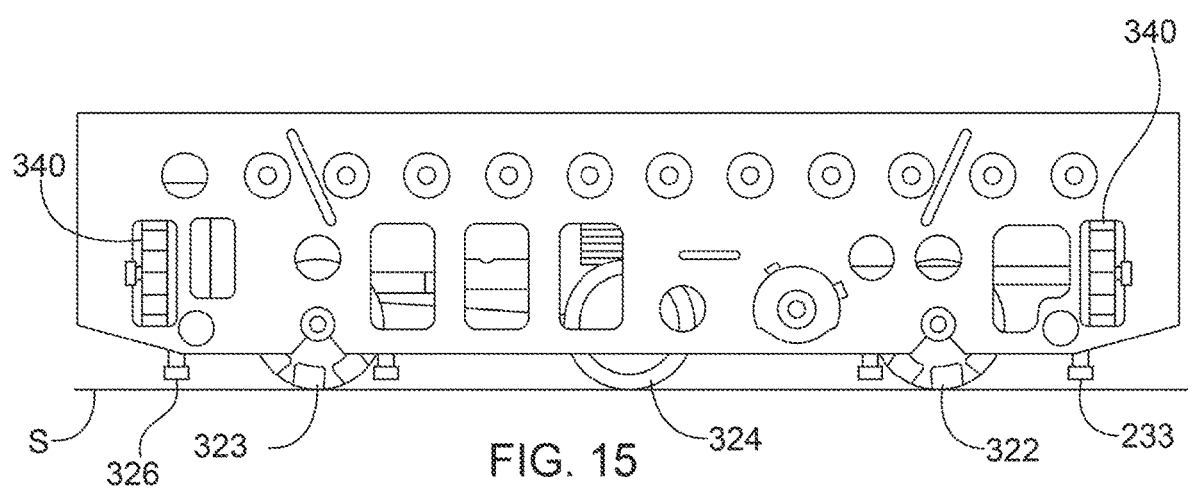
FIG. 15 is a side elevational view of the retrieval vehicle illustrated in FIG. 12.

Alternatively, as illustrated in FIGS. 13-15, the vehicle may have a horizontal drive 320 formed of a plurality of rollers 322, 323, 324 that are rotatable around a first axis, such as around an axle. Additionally, the rollers 322, 323, 324 may be constrained to rotation about a single axis. For example, in the embodiment illustrated in FIGS. 13-15, the horizontal drive 320 includes a pair of central rollers 324 and first and second sets of outer rollers 322, 323. The first set 322 is positioned forwardly of the central rollers while the second set of rollers 323 is positioned rearwardly of the central rollers 324. The outer rollers 322, 323 may include rollers spaced apart along the length of a horizontal axle so that each set of outer rollers includes a first roller 323 on one side of the vehicle and a second roller 323 on an opposite side of the vehicle as shown in FIG. 14. Additionally, as shown in FIG. 14, each set of outer rollers may include a pair of rollers 323 on each side of the vehicle.

As noted above, the retrieval vehicle 310 may have any of a variety of steering mechanisms for controlling the direction of travel of the vehicle. For example, an optional steering mechanism is a zero-turn mechanism that can turn the vehicle without substantially moving forwardly. Optionally, the zero-turn mechanism provides a means for turning the vehicle about a vertical axis extending through the vehicle.

The zero-turn mechanism comprises a linkage that allows the wheels or rollers on one side of the vehicle to rotate at a different speed than the wheels or rollers on the opposing side of the vehicle. Optionally, the linkage allows the wheels or rollers on one side of the vehicle to rotate in different directions than the wheels or rollers on the opposing side of the vehicle. In this way, by varying the speed and/or rotational direction of the wheels on one side of the vehicle relative to the speed and/or rotational direction of the wheels on the opposing side of the vehicle, the zero-turn mechanism changes the direction of travel to steer the vehicle.

Optionally, the system may also include one or more guides to guide or align the vehicles as they travel. For instance, the guide may include a channel or groove and the vehicle may include a corresponding guide element that cooperates with the guide to control movement of the retrieval vehicle 310. One example of a guide element is a follower 326. The follower may be any element configured to engage with or cooperate with the guide. In the present instance, the retrieval vehicle 310 includes a central follower 326 that includes a rotatable element such as a bearing that rotates about a vertical axis. The central follower 326 engages the channel in the guide to constrain horizontal movement of the vehicle.

In addition to the horizontal drive mechanism 320 the vehicle may also include a vertical drive mechanism 340 for driving the retrieval vehicle 310 vertically along a track. In particular, as noted above, the system may include a guide mechanism such as a track 420 that is disposed adjacent a support structure. The vertical drive mechanism 340 may be configured to cooperate with the track 420 to drive the retrieval vehicle 310 vertically.

FIGS. 12-15 illustrate an exemplary vertical drive 340 that includes a plurality of rotatable gears 345, however, it should be understood that the vertical drive 340 may include any of a number of drive mechanisms for driving the vehicle vertically. Referring to FIG. 14, the vertical drive may include drive gear 345 that rotates about a horizontal axis that is transverse the horizontal axis of rotation of the horizontal drive mechanism 320. In particular, optionally, the vehicle includes a pair of drive gears 345 that are spaced apart from one another so that teeth of a first one of the gears 345 project outwardly from a first side of the vehicle and teeth of a second one of the gears 345 project outwardly from a second side of the vehicle as shown in FIG. 14. These first and second gears 345 may be synchronously driven. Additionally, as shown in FIG. 13, the vehicle may include two pairs of vertical drive elements that are spaced apart from one another along the length of the vehicle. In particular, optionally, the vehicle includes a first pair of vertical drive elements 345 at a first end of the vehicle and a second pair of vertical drive elements 345 at a second end of the vehicle.

Referring to FIGS. 12 and 13, the track of the retrieval system 300 may be configured so that the track on one side is spaced apart from the track on a second side a distance corresponding to the spacing between the first set of vertical drive elements 345 and the second set of drive elements 345. In this way, the first vertical drive element 345 may cooperate with the first track to drive the vehicle up the first track, while the second vertical drive element 345 may cooperate with the second track to drive the vehicle up the second track. Optionally, the two vertical drive elements 345 are synchronously driven so that the vehicle maintains a horizontal orientation as the vehicle moves from horizontal movement to vertical movement.

Optionally, the vertical drive 340 may be configured so that vertical drive has a width that remains substantially constant as the vehicle transitions from horizontal movement to vertical movement. In this way, the vertical drive 340 need not telescope of extend outwardly to transition from horizontal driving to vertical driving.

The vehicle may also include an optional transfer mechanism for transferring items between the vehicle and a destination, such as a storage location.

For instance, the transfer mechanism 350 may be operative to transfer an item between a platform surface of the vehicle and one of the plurality of destination areas 80. As shown in FIG. 12, the platform surface is optionally defined by the exterior surfaces of a plurality of rollers 356.

The transfer mechanism 350 may be any of a variety of mechanisms for loading items onto the vehicle and for unloading items from the vehicle into one of the storage areas. Additionally, the transfer mechanism 350 may be specifically tailored for a particular application. In the present instance, the transfer mechanism 350 comprises one or more displaceable element(s) configured to engage an item stored at a storage location and pull the item onto the vehicle. More specifically, in the present instance, the vehicle includes one or more displaceable element(s) configured to move toward a bin in a storage location and releasably engage the bin. After the displaceable element(s) engage the bin, each displaceable element is displaced away from the storage location, thereby pulling the bin onto the retrieval vehicle 310.

The displaceable element of the transfer mechanism may any of a variety of items, such as a bar, rod, or another element configured to engage an item, for example, a bin. For example, referring to FIGS. 12-15, the transfer mechanism 350 comprise the rollers that form the surface for receiving the bin. In particular, the rollers may be driven rollers so that rotating the rollers selectively operates to either transfer a bin onto the vehicle or to transfer a bin off of the vehicle. Additionally or alternatively, the transfer mechanism may include one or more displaceable pins 352 and a drive element for displacing the pins 352. For instance, optionally, the transfer mechanism 350 includes two drive elements in the form of endless carriers such as a drive belt or as shown drive chains 354. Optionally, each pin 352 projects or extends inwardly toward the longitudinal center line of the vehicle. The transfer mechanism is preferable configured to cooperate one of the bins to releasably engage the bin. For example, in the present instance, the pins 352 are configured to mate with a recess on the bin so that the transfer mechanism can engage the bin. However, it should be recognized that the transfer mechanism may include any of a variety of elements for engaging items to be transferred onto of off of the vehicle.

The vehicle includes one or more drive elements for driving the transfer mechanism. Optionally, the vehicle includes one or more motors that drive the transfer mechanism 350. For instance, one or more motors of the vehicle drive system may drive the chains 354 to selectively move the chains and pins 352 toward or away from storage locations, such as one of the bins 45 in the sortation system 50.

As the vehicle approaches a storage location to retrieve a bin, the chains may drive the displaceable pins 352 toward the storage location so that the pins underlie a groove or notch in the bottom of the bin. The vehicle travels a small distance upward until the pins 352 are disposed with the groove or notch of the bin. The chain 354 then reverses so that the pins 352 move away from the storage location. Since the pins engage the bin within the notch, when the pins move away from the storage location, the pins pull the bin onto a surface of the vehicle. In this way, the transfer mechanism 350 is operable to retrieve items from a storage location. Similarly, to transfer an item to a storage location 80, the chains 354 of the transfer mechanism 350 drives the pins 352 toward the storage location until the item is in the storage location. The vehicle then moves downwardly to disengage the pins from the bin, thereby releasing the bin.

The retrieval vehicle 310 may include a separate drive element for driving the transfer mechanism 350. Alternatively, the transfer mechanism may be interconnected with one of the horizontal or vertical drive elements of the vehicle. Specifically, the transfer mechanism may be connected with one of the drive systems so that the drive system is selectively operable between driving the vehicle and driving the transfer mechanism.

For instance, the transfer mechanism may optionally be connected with one of the horizontal drive systems with a selectable connection so that in a first orientation the drive system drives the vehicle horizontally and in the second orientation the drive system drives the transfer mechanism. The optional clutch mechanism may be selectively engaged and disengaged to initiate and terminate transmission of power, respectively, from the motor(s) of the horizontal drive system to the transfer mechanism, whereby the second drive system may be operated independently of the transfer mechanism.

Although the configuration of the retrieval vehicle 310 may vary, details of an exemplary vehicle operable with the retrieval system are provided in U.S. Published Patent Application No. 2021/0047117. The entire description of U.S. Published Patent Application No. 2021/0047117 is hereby incorporated herein by reference. Additionally, it should be noted that the aspects of the invention can be utilized in a system that does not include the retrieval vehicle.

In one or more embodiments, the retrieval vehicle 310 may be powered by an external power supply, such as a contact along a continuous charging rail or, alternatively, using an inductive power transfer coil, either of which serving to provide the electric power needed to drive the vehicle. However, in the present instance, the retrieval vehicle 310 includes an onboard power source that provides the requisite power for both the first drive motor and the motors that drive the second drive system. The onboard power supply may be rechargeable. In that regard, the power supply may include a power source, such as a rechargeable battery, a bank of ultra-capacitors, as capacitors or a combination of these. For example, ultra-capacitors can accept very high amperage in a recharging operation. By using a high current, the ultra-capacitors can be recharged in a relatively very short period of time, measurable in seconds or minutes as compared to the hours which may be required to charge a suitable battery. On the other hand, provisions can be made, according to one or more embodiments, to automate the process of replacing a discharged battery, with a recharged one, as part of the process of operating one or more of the vehicles.

Where a charging rail is used, each retrieval vehicle 310 may include one or more contacts for recharging the power source. In the present instance, the vehicle may include a plurality of brushes, such as copper brushes that are spring-loaded so that the brushes are biased outwardly. The brushes cooperate with a charging rail to recharge the power source, as described further below.

Optionally, the charging rails are conductive strips connected with an electrical supply. The charging contacts of the retrieval vehicle 310 engage the conductive strips to recharge the ultra-capacitors. Specifically, the biasing element of the brushes biases the brushes outwardly toward the charging contacts. The electricity flowing through the charging contact provides a high amperage, low voltage source that allows the ultra-capacitors to recharge in an interval measurable in seconds or minutes, depending upon the amount of power consumed during a sequence of inventory management tasks or subtasks.

In some embodiments, the processor of each vehicle controls the operation of the vehicle in response to signals received from the controller 20. Additionally, the vehicle includes a wireless transceiver so that the vehicle can continuously communicate with the controller 20 as it travels along the track. Alternatively, in some applications, it may be desirable to incorporate a plurality of sensors or indicators along paths which the vehicles may traverse. The vehicle may include a reader for sensing the sensor signals and/or the indicators, as well as a central processor for controlling the operation of the vehicle in response to the sensors or indicators.

Retrieval Column

As discussed above, the sortation system 50 may include a plurality of storage locations that contain a plurality of bins 45. For instance, the storage locations may be configured as a rack having an array of horizontal rows and/or vertical columns. The retrieval system 300 may comprise a track 420 positioned along one or more of the sortation racks. For instance, the track 420 may be fixedly connected to the sortation system 50. The track may be configured to guide vehicles 310 vertically so that the vehicles may be conveyed up and down the track to retrieve a full bin. The track may be formed as one or move columns 400 positioned adjacent the storage locations. For instance, the retrieval track may include one or more columns 400 of vertical tracks 420 configured to cooperate with the retrieval vehicles 310 so that the retrieval vehicles can ascend to the storage locations 80 of the sortation system 50.

As shown in FIGS. 2-5 and 16-20, the retrieval system 300 may include a moveable track 400 configured to guide the retrieval vehicles 310 to retrieve a full bin 45. Since the bins may be located in a plurality of vertically spaced apart storage locations, the moveable track 400 may be formed as a vertical track so that the retrieval vehicles can ascend the track. Optionally, the track includes a plurality of tracks forming a column and the vehicle is configured to drive vertically within the column to retrieve a full bin. Additionally, the column may be configured so that the vehicle may raise and lower the track while the vehicle is positioned within the column 400 as discussed further below.

Referring to FIGS. 16-21, a moveable retrieval column configured to cooperate with the retrieval vehicles 310 is designated generally 400. The retrieval column 400 may be a lift such as an elevator that includes a powered element for lifting the retrieval vehicle. Alternatively, the structure may include a guide or track configured to cooperate with the vehicle to raise the vehicle without an externally powered mechanism. For instance, the retrieval column 400 may include a track 420 configured to cooperate with the vertical drive 340 of the retrieval vehicle. The vehicles may drive up the track 420 to lift the vehicle to the desired storage location in the sortation system.

The retrieval column 400 may be moveable so that the structure can be moved to different storage locations or columns of the sortation storage racks 60, 62. Further still, optionally, the retrieval column 400 is configured to cooperate with the retrieval vehicle 310 so that the vehicle can lift the retrieval column vertically and convey the retrieval column horizontally along a path toward a storage location, such as along a path toward one of the columns of the sortation racks 70, 72. In this way, the vehicle may be configured to move the track vertically or horizontally to a desired location and then climb the track to retrieve a full bin.

Referring to FIGS. 16-21, the moveable retrieval column 400 will now be described in greater detail. The retrieval column 400 includes a plurality of track elements for guiding the retrieval vehicle. Additionally, the retrieval column may include an optional transfer assembly that is separate from the vehicle. The optional transfer assembly is operable to engage a bin 45 in one of the storage locations 80 and transfer the bin onto the vehicle. The retrieval column may also include a storage mechanism for storing one or more bins while the retrieval vehicle retrieves a full bin or delivers an empty bin to an empty storage location.

The moveable track includes a support structure forming a vertical column. The column includes a plurality of spaced apart vertical posts 410a,b,c,d. The posts are generally parallel to one another and spaced apart to form a column having a length and width corresponding to the length and width of the vehicle. In particular, the vertical posts are spaced apart so that post 410a and 410b form an opening at least as wide as the width of the vehicle. Post 410c is parallel to post 410a and spaced apart from post 410a a distance at least as long as the approximate length of the vehicle. Post 410d is parallel to post 410b and 410c and together with post 410c forms an opening that forms a discharge opening for transferring items between the vehicle and a storage location. The moveable column 400 may include a plurality of horizontal rails 412 interconnecting the posts 410a-d and or cross brackets connecting the posts to form a free-standing structure.

The moveable column 400 may also include a structure that cooperates with the vertical drive 340 of the vehicle so that the vehicle can climb upwardly. For instance, the moveable column may include one or more track elements configured to cooperate with the vehicle to allow the vehicle to climb upwardly. Optionally, the track elements may include a plurality of teeth vertically spaced apart along the track. The track may have teeth spaced at a uniform pitch to cooperate with the climbing gears 220 of the vehicle. Although the track 420 is described as having a plurality of teeth, it should be understood that the track can be any of a variety of structures configured to permit the vehicle to climb upwardly. Accordingly, the term track may mean any guide configured to cooperate with the track to facilitate the vertical displacement of the vehicle.

The track 420 may be connected with the structure 400 in a variety of orientations depending upon the configuration of the vertical drive of the vehicle. In the present instance, the track is oriented to cooperate with the vertical drive gears 220 of the vehicle. Optionally, the track is connected with the structure 400 to cooperate with the vehicle so that the vehicle can climb vertically while maintaining the orientation of the vehicle relative to the horizon. In other words, the track may be connected with the structure so that the vehicle can climb the track without tilting relative to the horizon.

For instance, a first track element 420*a* may be mounted on the inside of post 410*a* and a second track element 420*b* may be mounted on the inside of post 410*b*. The two tracks 420*a,b* may be spaced apart a distance corresponding to the distance between the drive gears 345 of the vehicle. Similarly, a third and fourth track may be mounted on the inside of posts 410*c* and 410*d* and spaced apart a distance corresponding to the distance between the drive gears. Accordingly, the vertical drive gears 345 of the vehicle may be driven synchronously so that the vehicle may climb the tracks while maintaining the horizontal orientation to keep the vehicle from tipping relative to the horizon.

Figure 16:
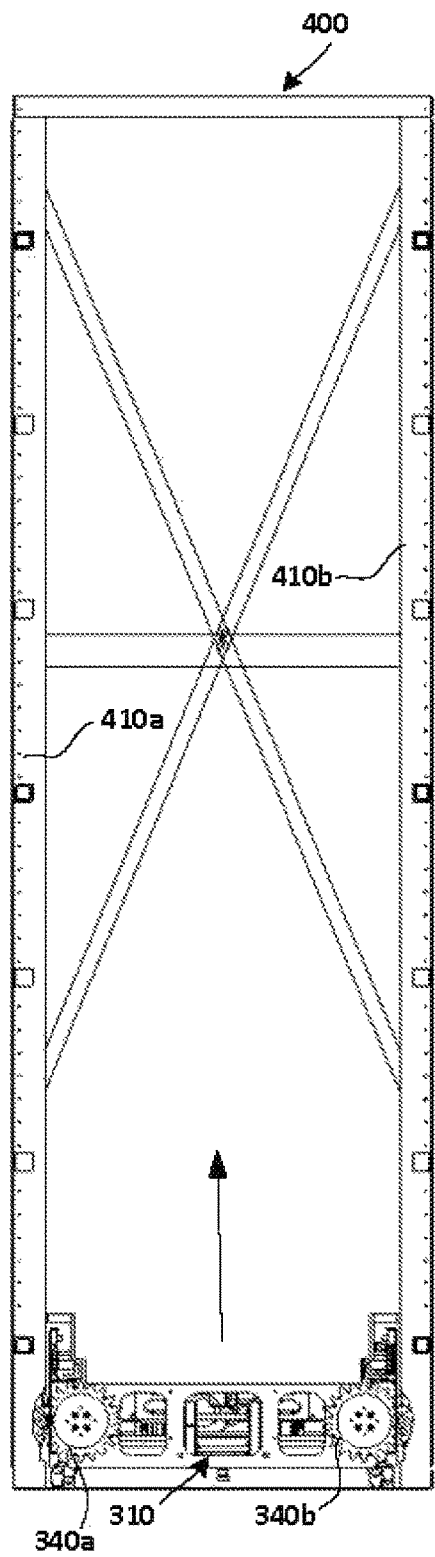
FIG. 16 is an end view of a retrieval system of the material handling system illustrated in FIG. 1B.
Figure 17:
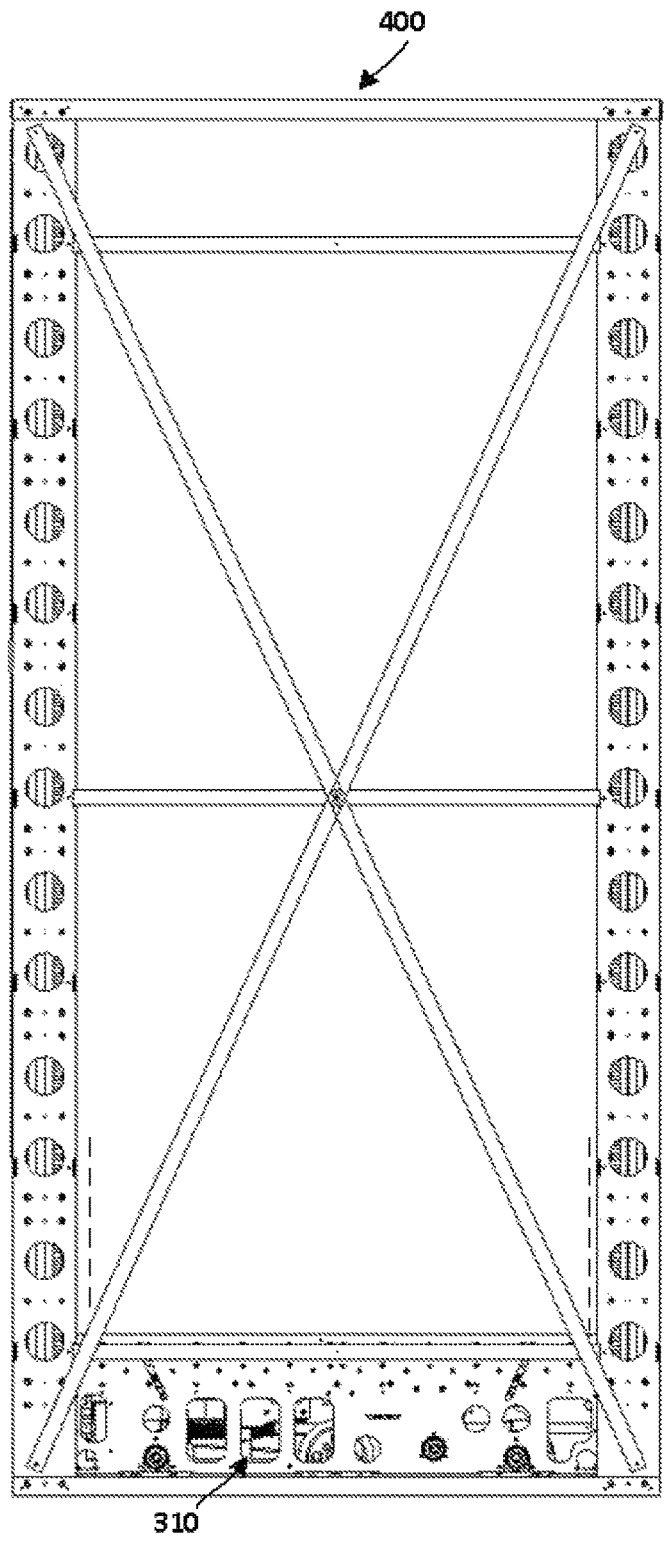
FIG. 17 is a side view of the retrieval system illustrated in FIG. 16.
Figure 18:
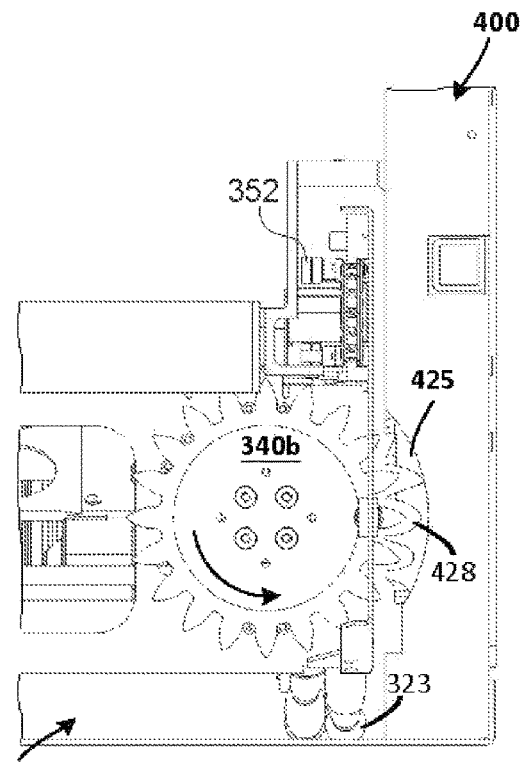
FIG. 18 is an enlarged fragmentary view, partially cut away, of the retrieval system illustrated in FIG. 16.
Figure 19:
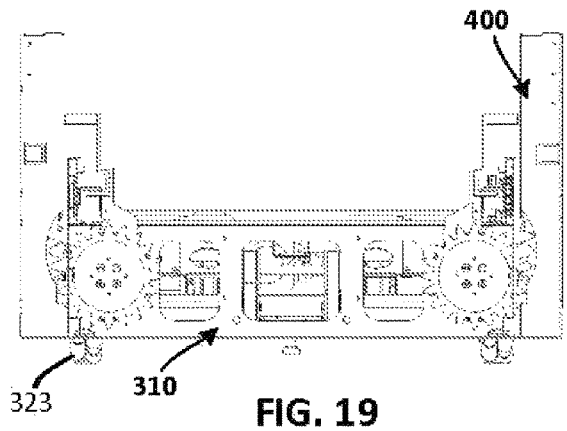
FIG. 19 is an enlarged fragmentary view, partially cut away, of the retrieval system illustrated in FIG. 16.
Figure 20:
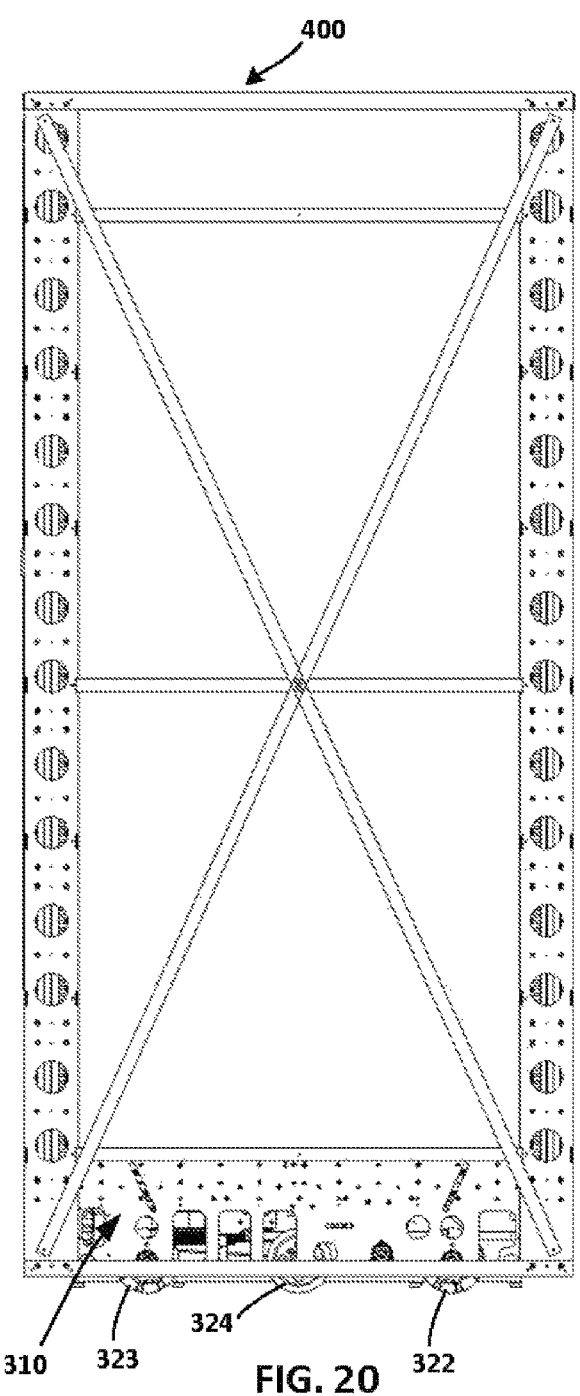
FIG. 20 is a side elevational view of the retrieval system of FIG. 16 with the assembly illustrated in a raised position.

Referring to FIGS. 16-18, the moveable track 400 is shown with the retrieval vehicle 310 in a lowered position so that the vehicle is on a horizontal surface, such as the floor. The moveable track may be resting on the same horizontal surface as the vehicle. In FIGS. 19-20 the moveable track is shown in a raised position in which the vehicle has lifted the track. Specifically, when the retrieval vehicle 310 is positioned within the column, activating the vertical drive 340 in a first direction causes the vertical drive 340 to drive the track upwardly, thereby lifting the moveable track 400. Once the vehicle raises the moveable track, the horizontal drive 322,323,324 are operable to displace the vehicle horizontally to move the moveable track horizontally.

Additionally, when the retrieval vehicle 310 is positioned within the column, driving the vertical drive 340 in a second direction causes the vehicle to lower the moveable track if the track is raised. Alternatively, if the moveable track is supported on the floor or similar horizontal surface, driving the vertical drive 340 in a second direction causes the vehicle to drive upward along the track. Similarly, if the vehicle is in the track above the ground, driving the vertical drive in the first direction causes the vehicle to drive vertically downwardly until the vehicle reaches the ground.

The vertical drive 340 of the vehicle may be configured so that the vertical drive gears 345 are displaceable inwardly to reduce the distance between the vertical drive gears. In this way, the drive gears can be moved inwardly to provide clearance between the tracks 420 and the vertical drive gears as the vehicle drives into the column. Alternatively, as described above, the vertical drive gears may be mounted on shafts so that the axis of rotation of each vertical gear is substantially parallel to the horizontal direction of travel. Additionally, the axes of rotation of the vertical drive gears may be substantially fixed so that the lateral distance between each pair of vertical drive gears is substantially fixed. Therefore, in order to enter the column, the teeth of the vertical drive teeth are aligned with the teeth in the track 420 so that the teeth of the vertical drive gears pass through the teeth in the track.

Referring to FIG. 18, the track 420 and the vertical drive gear 345 may be aligned so that the vertical drive gears do not impinge upon or contact the track when the vertical gear is translated relative to the track. Specifically, the track 420 and the drive gear may be configured to allow the teeth of the drive gear to pass through the teeth of the track when the vehicle 310 drives into the retrieval column 400. For instance, the spacing between the teeth of track 420 may provide sufficient clearance for the teeth of the vertical drive gear 345 to pass between the gaps between the teeth of track gear 420 when the vertical drive gear translates horizontally along a line that is parallel to the axis of rotation of the vertical drive gear 345. Details of an exemplary configuration of the track and vertical drive gears are provided in U.S. Published Patent Application No. 2021/0047117.

Additionally, the lower section 425 may optionally have a tapered pitch line so that the clearance between adjacent teeth gradually diminishes as the teeth progress up the height of the lower section. In other words, the clearance 428 between adjacent teeth at the bottom of the lower section is greatest and the spacing between adjacent teeth at the upper part of the lower section is at a minimum and the clearance gradually decreases from the maximum to the minimum.

Configured as described above, the vertical drive 340 may optionally be configured to pass through openings in the track 420 of the retrieval column 400 so that the vertical drive 320 is aligned with the track. After the vertical drive is aligned with the track, the vertical drive is positioned to cooperate with the track to raise the retrieval column 400 and/or to climb the retrieval column as described further above.

Optionally, the moveable track 400 may incorporate one or more connector or retainer 440 that releasably connects the moveable track with the sortation system 50. Optionally, the sortation system 50 may include a mating connector 150 that matingly engages the connector 440 on the moveable rack. The connectors 150, 440 may be any of a variety of mechanical connectors. In the present instance, the connectors 150 may be configured as a hanger to cooperate with connector 440 are configured so that relative vertical displacement of the column relative to the sortation system connects the two connectors. Optionally, relative vertical displacement of the column relative to the sortation system in the reverse direction releases the two connectors.

Referring to FIGS. 2-5 and 33-35, the details of a releasable connector or retainer 440 will be discussed in greater detail. The retainer 440 is configured to cooperate with an upper connector 150 on the sortation system 50 to align the retrieval column 400 relative to the sortation system 50. The retainer 440 optionally includes one or more pins that fit into recesses or grooves of the upper connector 150. For example, the upper connector 150 may include a first v-groove 152 for aligning the retrieval frame in a first direction and a second v-groove 154 for aligning the retrieval frame in a second direction that is orthogonal to the first direction. As shown in FIGS. 34-35, the v-grooves may have a rounded root so that the grooves form more of a u-shape. Either way, the upper connector 150 comprises grooves having converging tapered walls that guide the retainer 440 into a particular location.

In this way, one or more connectors optionally interconnect the retrieval column 400 with the sortation system to impede lateral displacement of the retrieval column relative to rack 70, 72 of the sortation system. It should be noted that the column 400 may rest on the floor surface. However, if there are variations in the floor, the column may not be vertically aligned with the storage locations 80/bins 45. In the present instance, as described above, the retainer 440 may hold the top of the column at a defined vertical position. In particular, the retainer may be configured to position the column 400 vertically relative to the sortation station.

Accordingly, the retainer 440 may be configured to locate the column at a predetermined position relative to the sort locations 80/bins 45.

The retrieval column 400 may also include an electrical contact 430 for providing an electrical connection between the retrieval column 400 and an external power source. For instance, the retrieval column 400 may include a contact that is releasably connectable with an electrical contact of the sorting system 50. Additionally, the retrieval column may have a plurality of electrical contacts for electrically connecting the retrieval column with an external electrical source whenever the retrieval column is at a station, such as the sorting system or an input/output station or other fixed station. In this way, the retrieval assembly 300 electrically connects with an external power source when the retrieval assembly is positioned at any of a variety of fixed stations in an automated warehouse system. Therefore, while the retrieval system is positioned at a fixed station and electrically connected with the external power source, the external power source can provide power for the retrieval system 300 to operate while the retrieval system is operating at the fixed station. Additionally, the retrieval system 300 charges the rechargeable power storage system onboard the retrieval system.

For example, the contact 430 on the retrieval column may releasably connect with an electrical connector on the sorting station to provide power to the retrieval column. The retrieval column may in turn include a separate electrical contact that releasably connects with the retrieval vehicle 310 when the retrieval vehicle is positioned within the retrieval column. In this way, while the vehicle operates within the retrieval column, such as by driving up the column and driving the carriage and optionally providing power for features of the retrieval system, such as the pump that provides suction for the vacuum ups 500, the vehicle remains electrically connected with the power supply from the sorting system to avoiding limit drain on the rechargeable storage device onboard the retrieval vehicle. It should be noted that the pump that provides suction to the vacuum cups and other electrical components of the retrieval system may be directedly connected with the electrical contact 430 so that such electrical components need not be electrically connected with the retrieval vehicle.

Configured as discussed above, the system may optionally include a moveable track 400 that cooperates with a portion of the system to enable the retrieval vehicle to retrieve a bin from a raised storage location. Specifically, the retrieval vehicle 310 may be controlled by a controller, such as a central controller 20, to guide the vehicle into alignment with an opening configured to receive the vehicle. Optionally, the moveable track comprises a moveable column and the vehicle is aligned with an opening into the interior of the column. The vehicle may then drive through the opening and into the column. The retrieval vehicle 310 may be driven into alignment with a track 420 in the column so that a drive mechanism of the vehicle engages the track. For instance, optionally, the vehicle includes a vertical drive mechanism 340 that cooperates with the track 420.

Once the vertical drive 340 of the retrieval vehicle is aligned with the track 420, the system may control the vertical drive to drive the vertical drive in a first direction that operates to raise or lift the moveable track 400 above the surface that supports the vehicle. Once the track is lifted, the retrieval vehicle 310 may be driven in a horizontal direction to move the moveable track to an alternate location. Optionally, a horizontal drive system 120 of the vehicle is controlled to drive the vehicle. For instance, the vehicle may be driven toward a structure such as the sortation racks 70, 72 rack so that an opening of the moveable column is aligned with a storage location of the sortation racks 30, 32.

Figure 21:
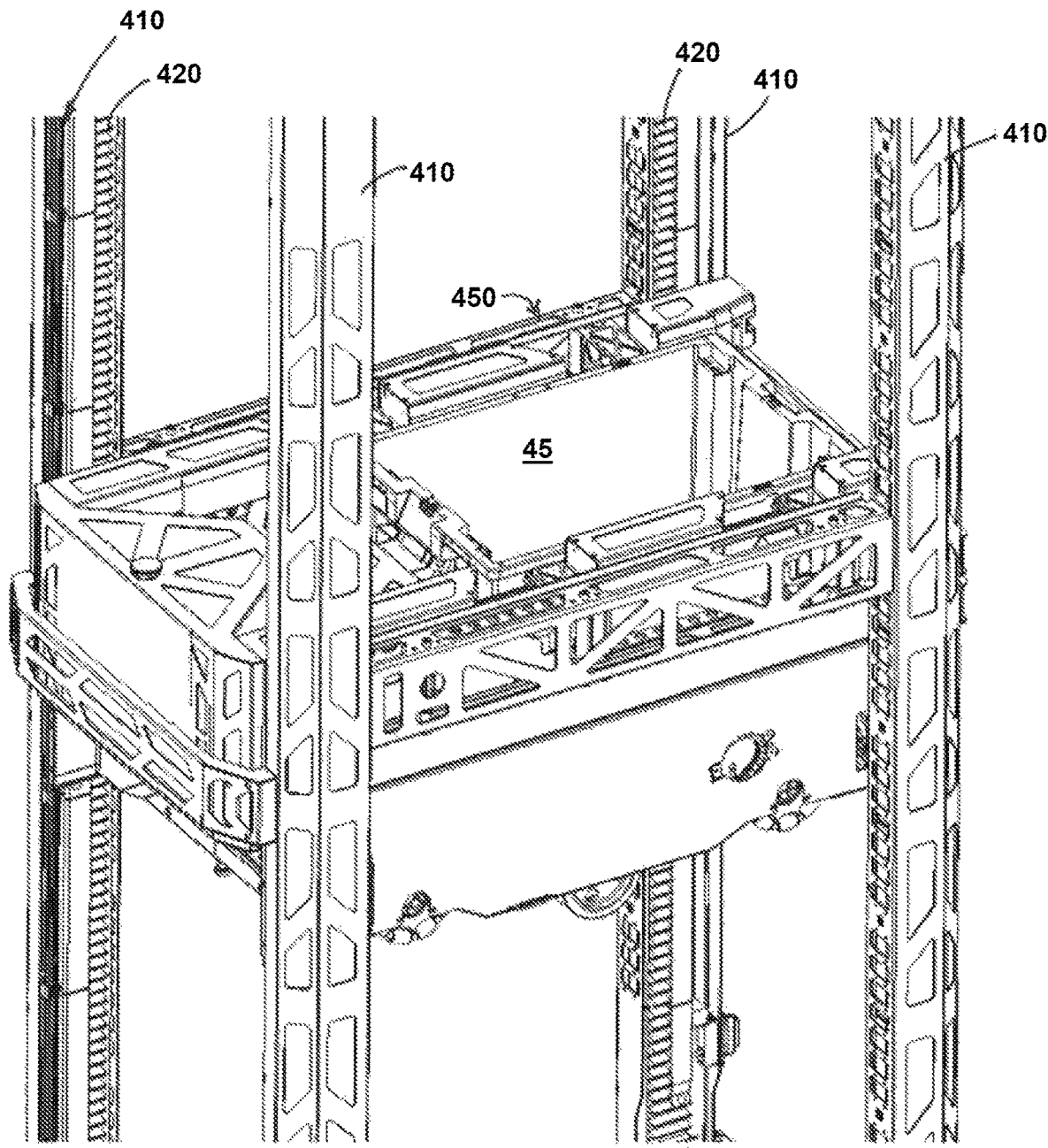
FIG. 21 is a fragmentary perspective view of the retrieval system of FIG. 16 with the retrieval vehicle illustrated in a raised position.

In addition to moving the moveable track 400, optionally the retrieval vehicle 310 is configured to climb the track. For instance, the moveable track may include a track 420 that extends vertically upwardly and once the column is positioned on the ground adjacent one of the racks 70, 72, driving the vertical drive 340 in the second direction operates to drive the retrieval vehicle vertically up the track 420. As shown in FIGS. 20-21, the vehicle may drive vertically upwardly until the vehicle is aligned with an opening in the column and an open storage location 40 in one of the sortation racks 70, 72. Once aligned with the open storage location, the vehicle may transfer an item, such as a bin 45 from the storage location onto the vehicle. In this way, the vehicle is operable to move a moveable track, climb the track and retrieve a full bin 45 from a storage location 80.

Transfer Assembly

As described above, the retrieval vehicle 310 may include a transfer mechanism 350 such as transfer pins 352 or the transfer roller bed 356 for transferring an item such as a bin onto the vehicle. Additionally, referring to FIG. 21, it may be desirable to incorporate a separate transfer assembly configured to retrieve bins from the storage locations. The separate transfer assembly 450 may be connectable with the retrieval vehicle 310 so that the transfer assembly 450 remains connected with the retrieval vehicle when the retrieval vehicle disengages the retrieval column and travels away from the retrieval column. Optionally, as described below, the transfer assembly may be configured to be retained within the retrieval column so that the retrieval vehicle releasably engages and disengages the transfer assembly when entering and exiting the retrieval column as discussed below.

Figure 22:
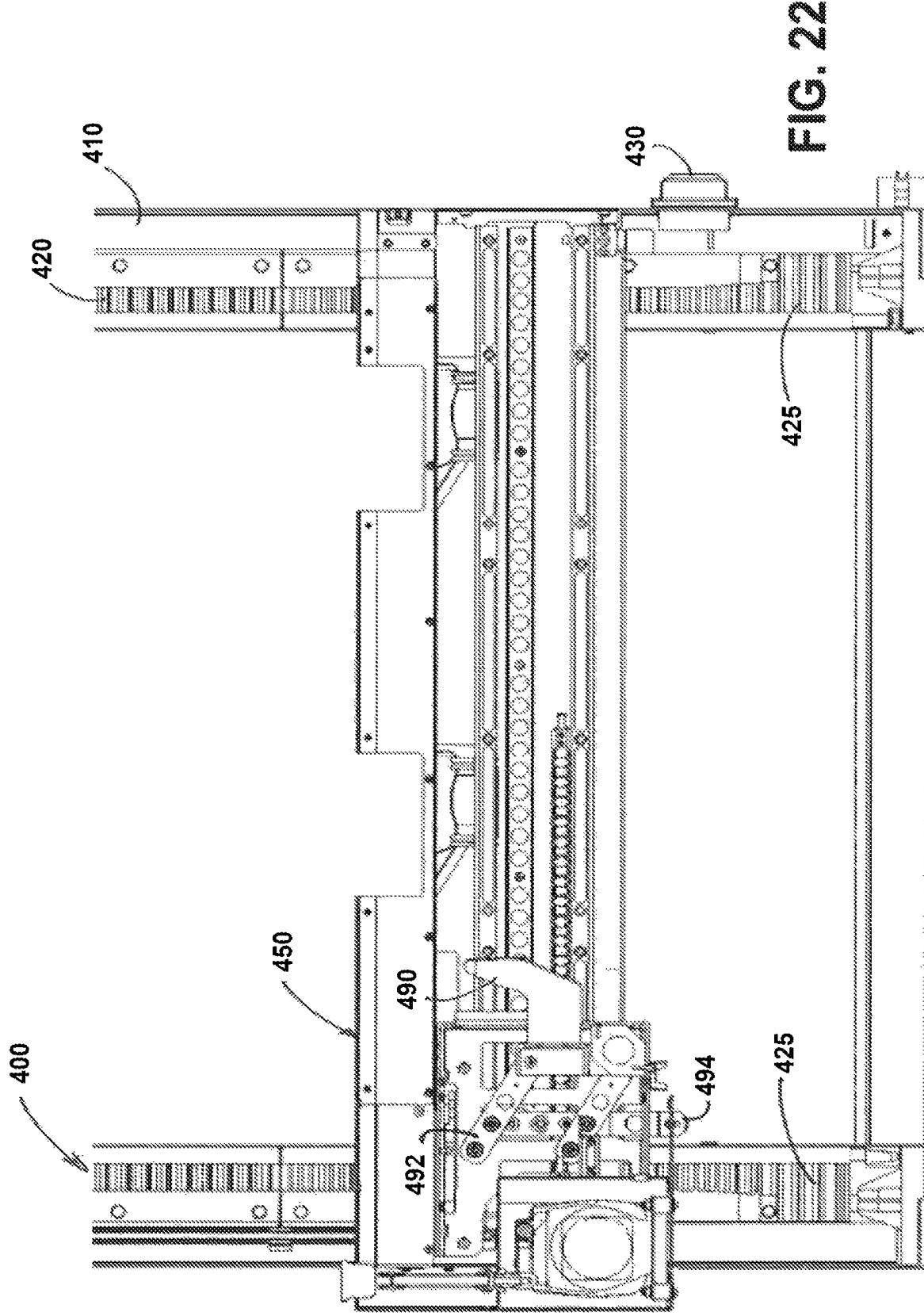
FIG. 22 is a fragmentary side view of a carriage and track of the retrieval system illustrated in FIG. 16.

Referring to FIG. 22, the retrieval column 400 is illustrated with a transfer assembly 450 positioned within the retrieval column at a lowered position. The transfer assembly 450 is positioned a height above the ground surface greater than the height of the retrieval vehicle 310. In this way, as the retrieval vehicle enters the moveable column 400, the retrieval vehicle drives under the transfer assembly. When the four vertical drive gears 345 of the retrieval vehicle are aligned with the vertical tracks 420 in the column 400, the vehicle is aligned with the transfer assembly 450. Driving the vehicle 310 upwardly drives the vehicle into operative engagement with the transfer assembly. As the vehicle 310 continues to drive upwardly, the vehicle lifts the transfer assembly upwardly so that the vehicle and the transfer assembly move together.

Figure 29:
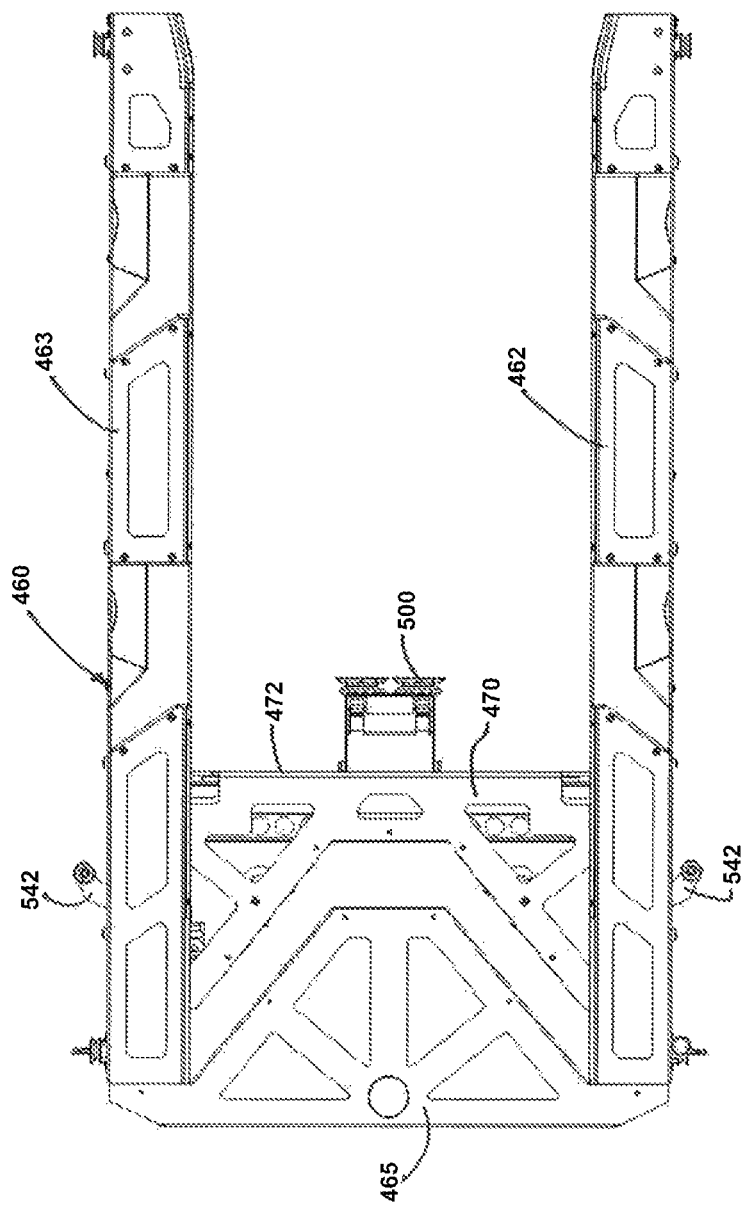
FIG. 29 is a plan view of the carriage illustrated in FIG. 27.
Figure 30:
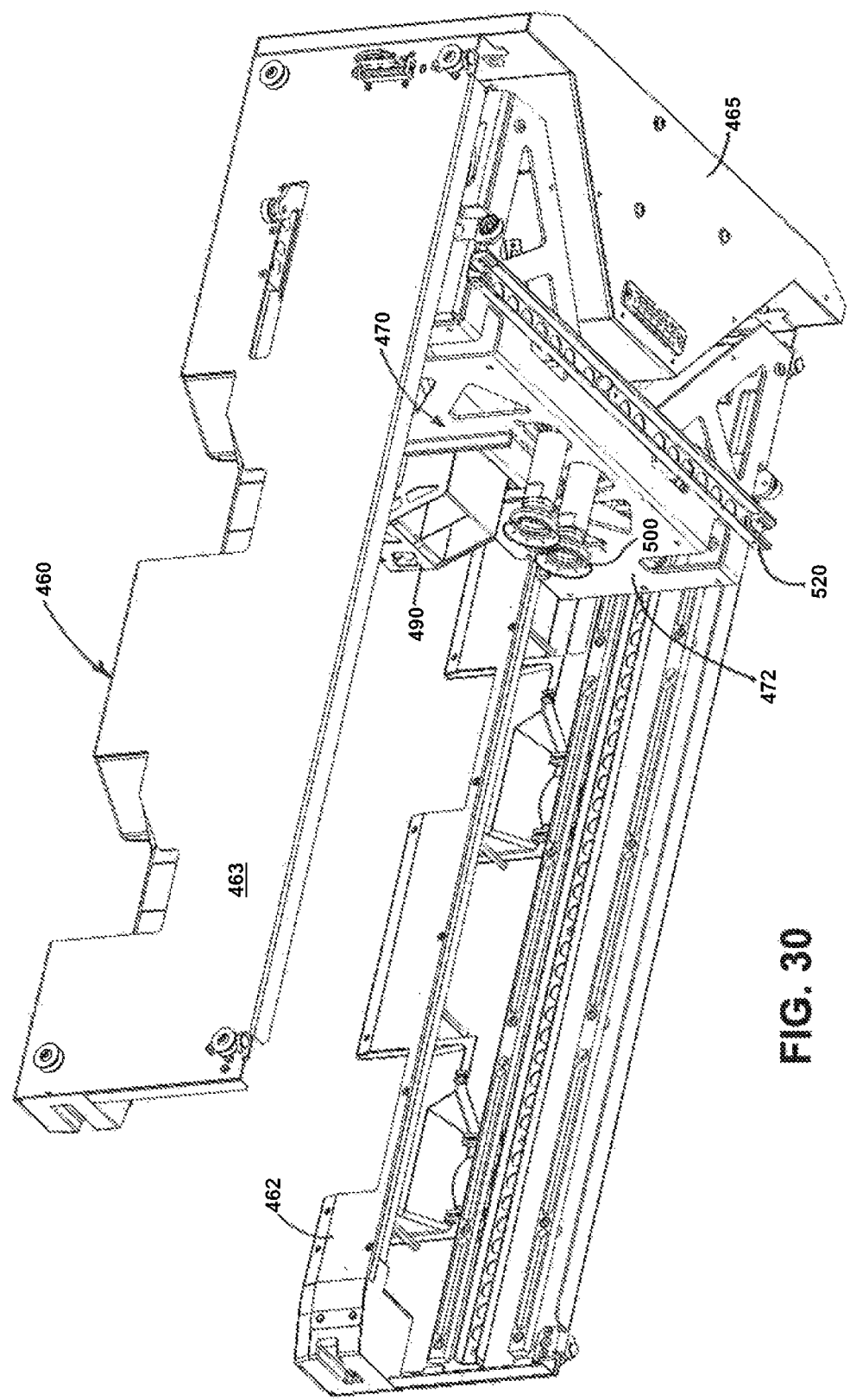
FIG. 30 is a perspective view of the carriage illustrated in FIG. 27 viewed from a point of view below the carriage.
Figure 31:
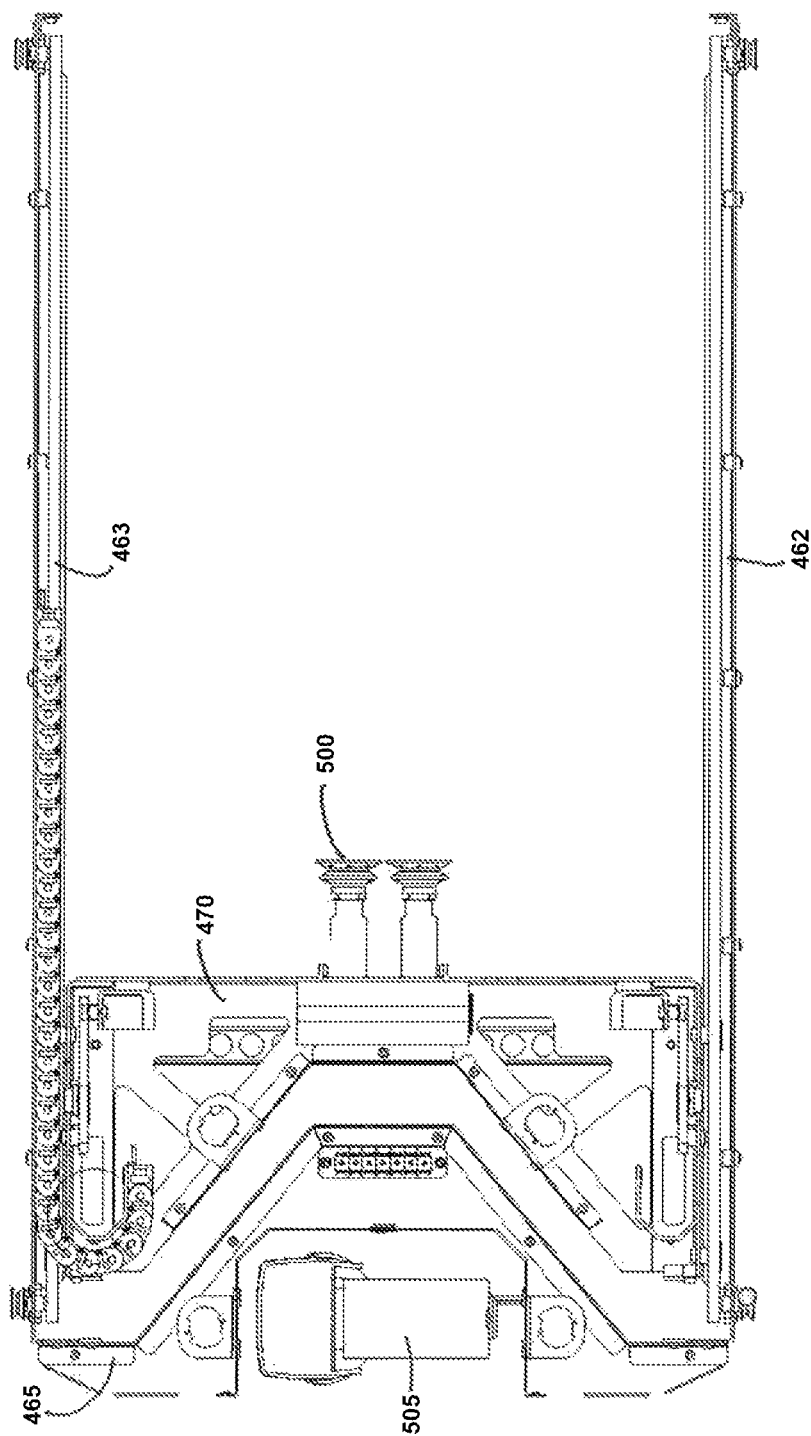
FIG. 31 is a plan view of the carriage illustrated in FIG. 27 partially broken away.
Figure 36:
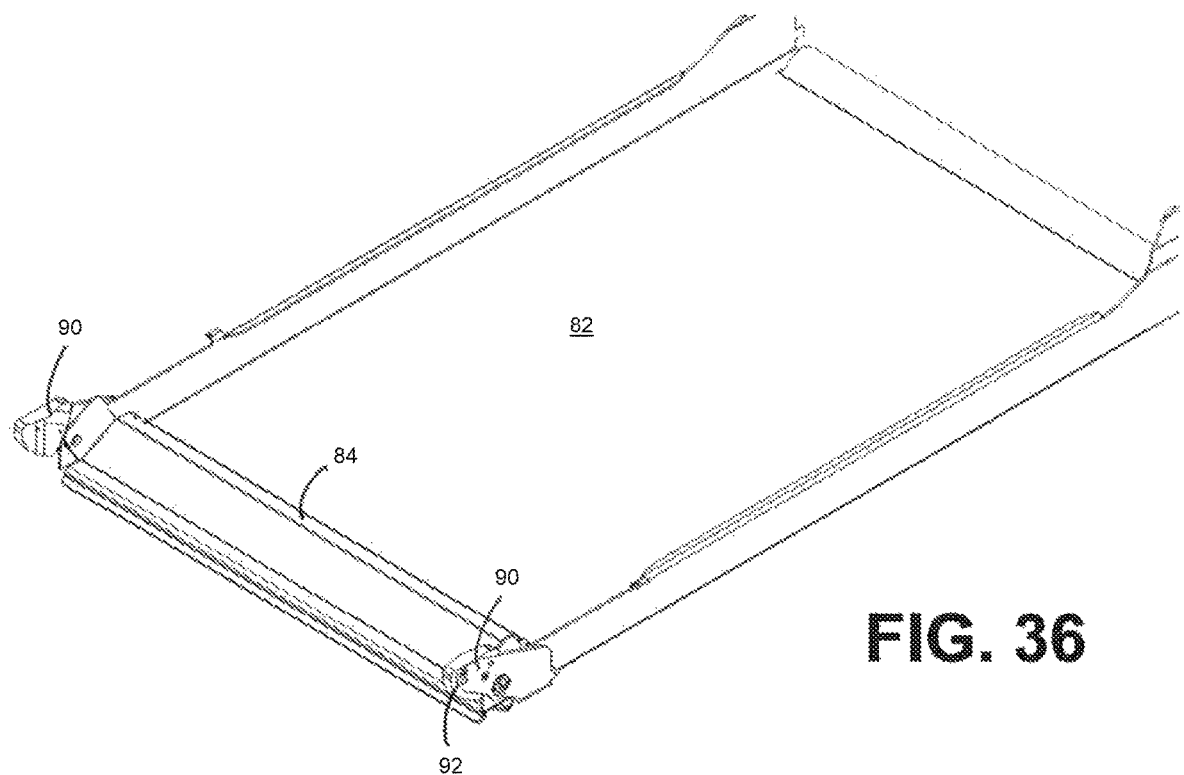
FIG. 36 is a perspective view of a sortation location of the sortation system illustrated in FIG. 6.
Figure 37:
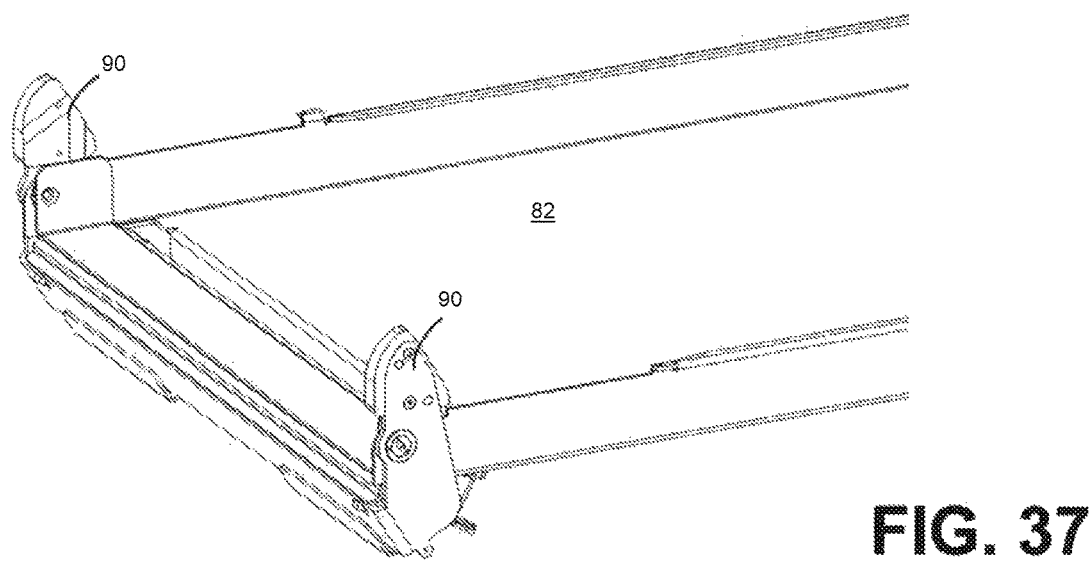
FIG. 37 is an enlarged fragmentary perspective view of the sortation location illustrated in FIG. 36 with a retainer illustrated in an open position.
Figure 38:
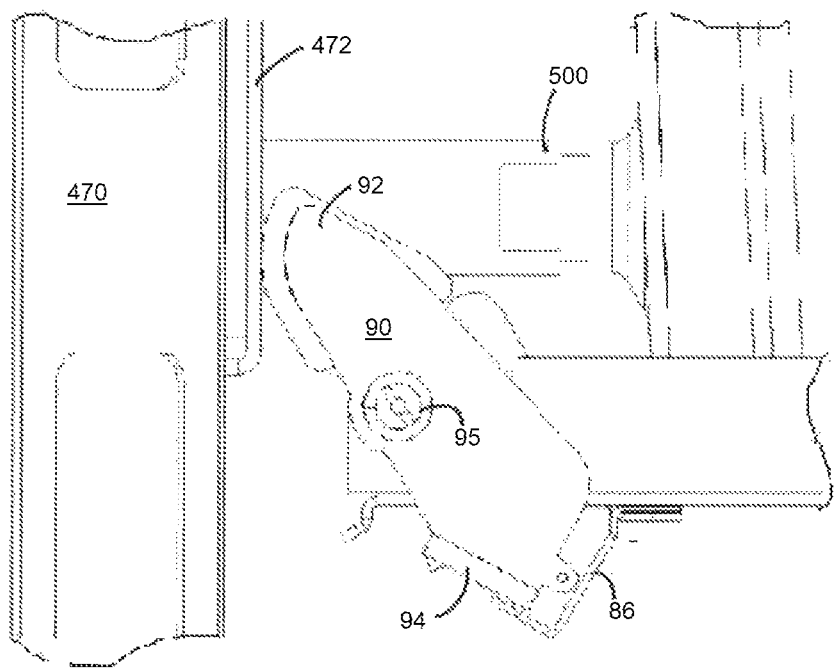
FIG. 38 is an enlarged fragmentary side view of the retainer illustrated in FIG. 37.

The transfer assembly 450 may include any of a variety of elements configured to extend into engagement with a container and pull the container onto the vehicle 310. In the present instance, the transfer assembly 450 includes a carriage 460 having a pair of sidewalls 462, 463 spaced apart wide enough to accommodate the width of the bin or container to be retrieved, as shown in FIG. 29. The sidewalls 462, 463 are connected by an end wall 465 to form a generally U-shaped configuration having an open end through which the containers or bins transfer between the vehicle and the storage areas 80.

Figure 28:
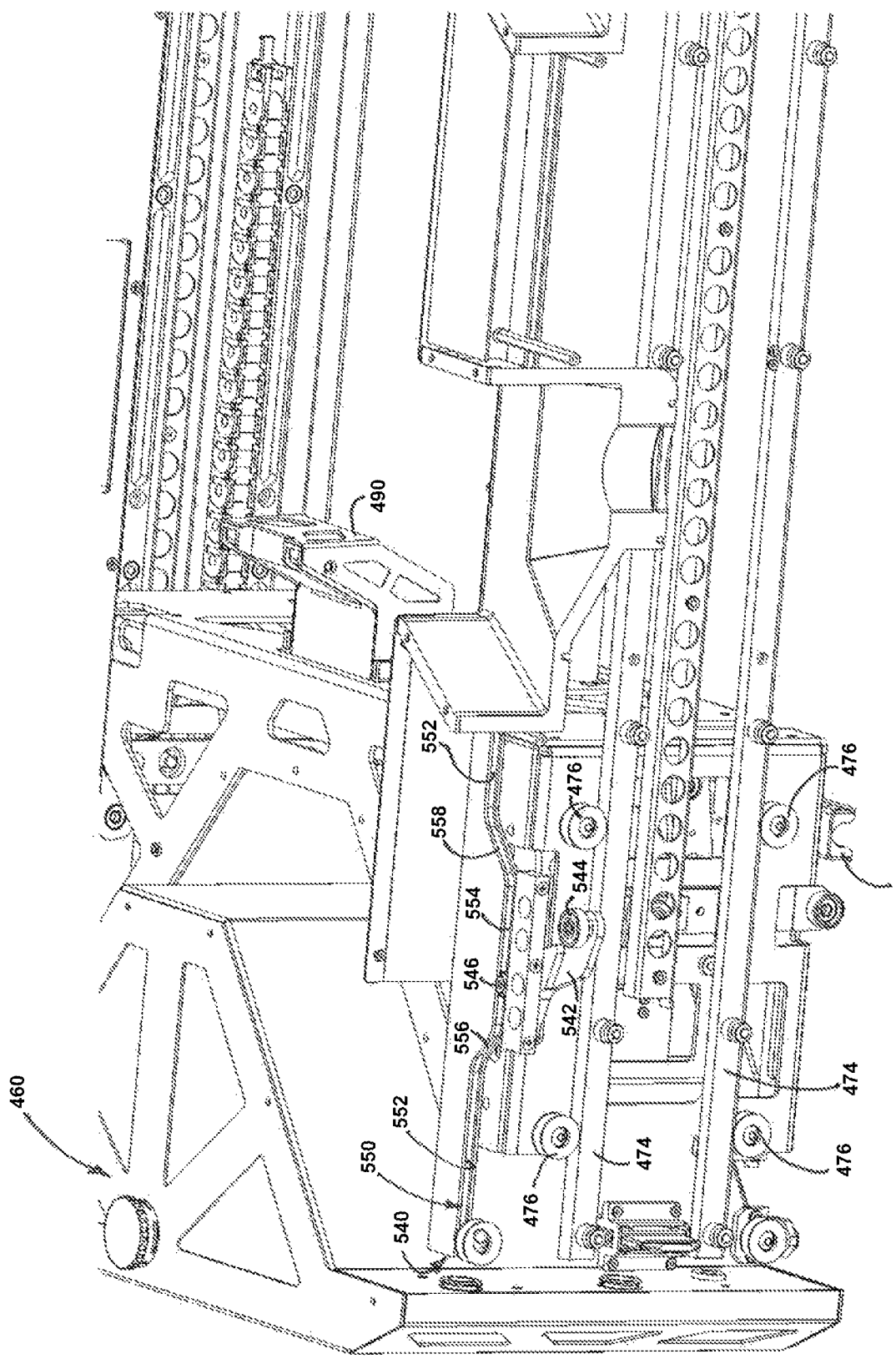
FIG. 28 is an enlarged fragmentary perspective view of the carriage illustrated in FIG. 27.

The transfer assembly 450 may include a moveable transfer head 470 configured to move along the length of the carriage 460 to transfer a bin 45 between the vehicle 310 and a storage location 80. For instance, as shown in FIG. 28, the sides 462, 463 of the carriage may include a plurality of elongated guide rails 474 that extend along the length of the sides of the carriage 460. The guide rails on the first side are parallel with the guide rails on the second side to form guide surfaces for the transfer head 470 as the transfer head moves between a retracted position and an extended position. The transfer head 470 may include a plurality of guide wheels or roller 476 that ride on the guide rails 474 to provide a rolling engagement between the transfer head and the carriage 460.

The transfer head 470 is operable between an retracted position and an extended position. In the retracted position, the transfer head is positioned adjacent to or abutting the end wall 465 of the carriage 460. In the extended position, the transfer head is located adjacent the ends of side walls 462, 463 at the open end of the carriage and remote from the end wall 465 so that the transfer head is positioned to be able to operatively engage a bin 45 in a storage location 80.

The transfer head 470 may be independently powered, however, in the present instance, the transfer head 470 is driven by the retrieval vehicle 310. In particular, one of the displaceable elements of the retrieval vehicle 310 may cooperate with the transfer head 470 to drive the transfer head between the extended and retracted positions. The power for the transfer head may be provided from any of a variety of moveable elements of the retrieval vehicle. For instance, the transfer head may include an element for engaging the transfer mechanism 350 of the retrieval vehicle.

Referring to FIGS. 23 and 25-28, an embodiment is illustrated in which the transfer mechanism 350 of the vehicle cooperates with the transfer head to drive the transfer head. A channel 520 extends across the width of the transfer head 470. The channel is configured to engage the transfer pins 352 of the retrieval vehicle. Specifically, the channel has a length that is substantially the same as the distance from the transfer pin 352 on one side of the vehicle 310 to the transfer pin on the other side of the vehicle.

Figure 23:
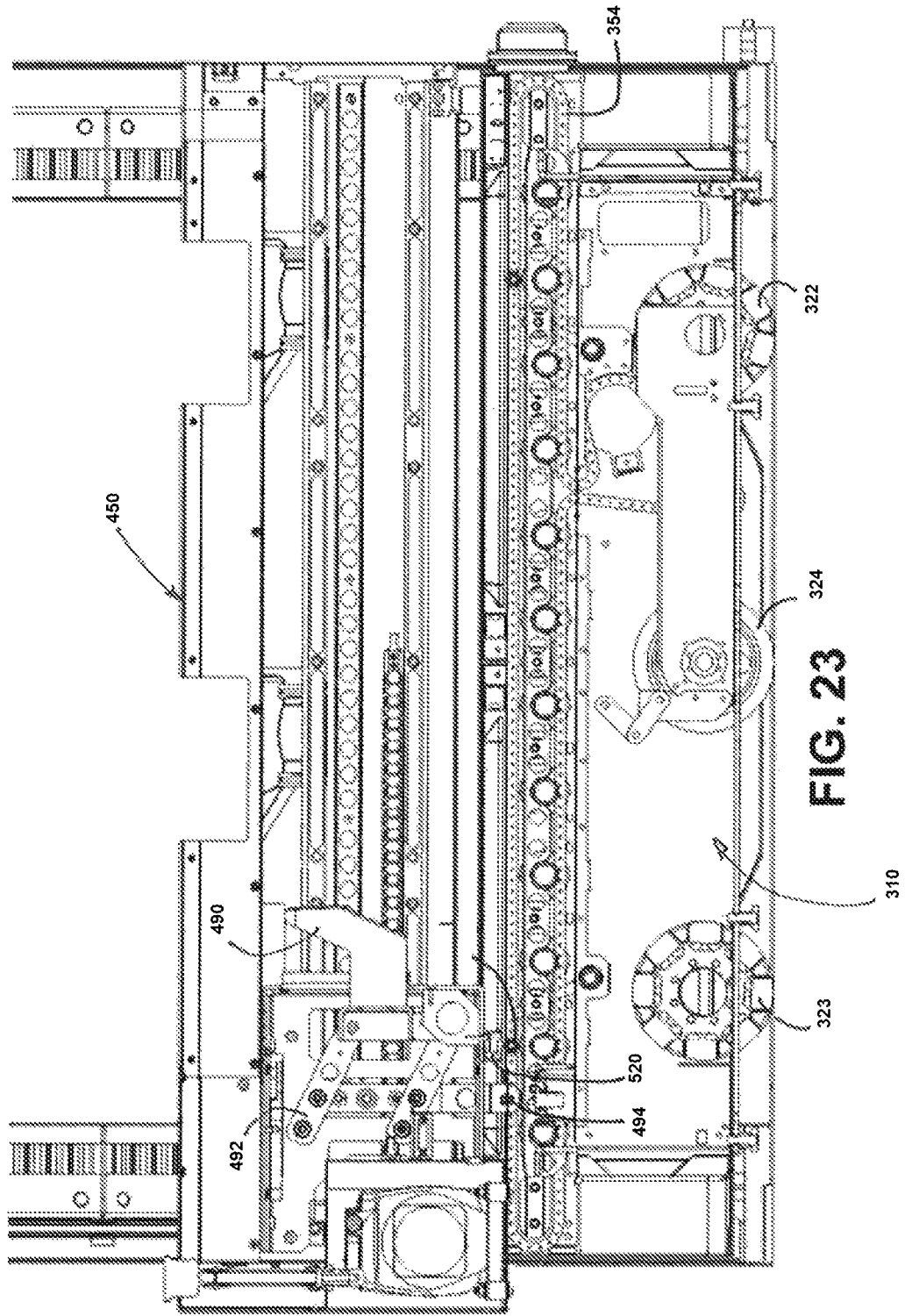
FIG. 23 is a fragmentary cut away side view of the carriage and track illustrated in FIG. 22 in combination with the retrieval vehicle illustrated in FIG. 12.
Figure 24:
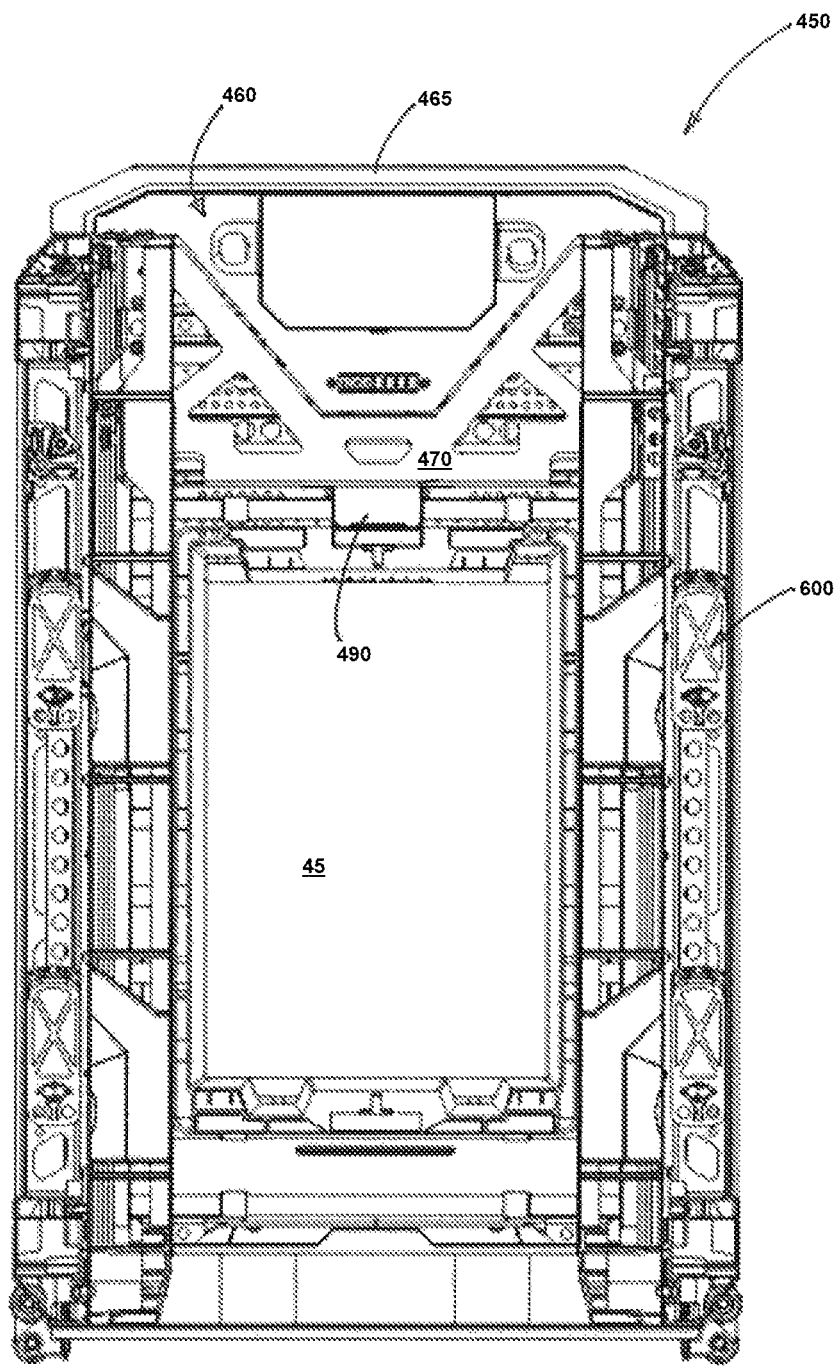
FIG. 24 is an elevation view of the carriage illustrated in FIG. 22 in combination with a bin.
Figure 25:
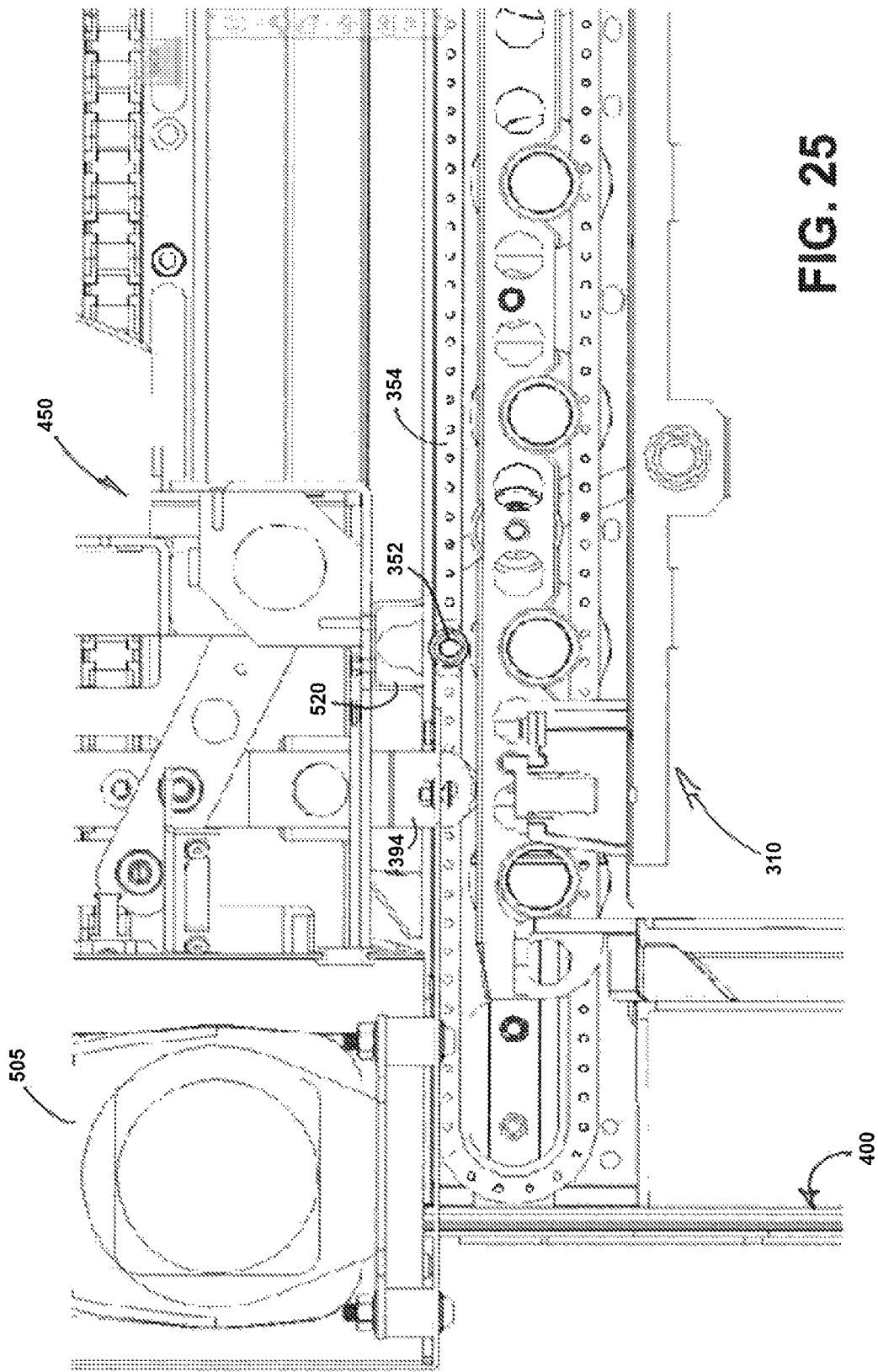
FIG. 25 is an enlarged fragmentary view of the view of the vehicle and carriage illustrated in FIG. 23.
Figure 26:
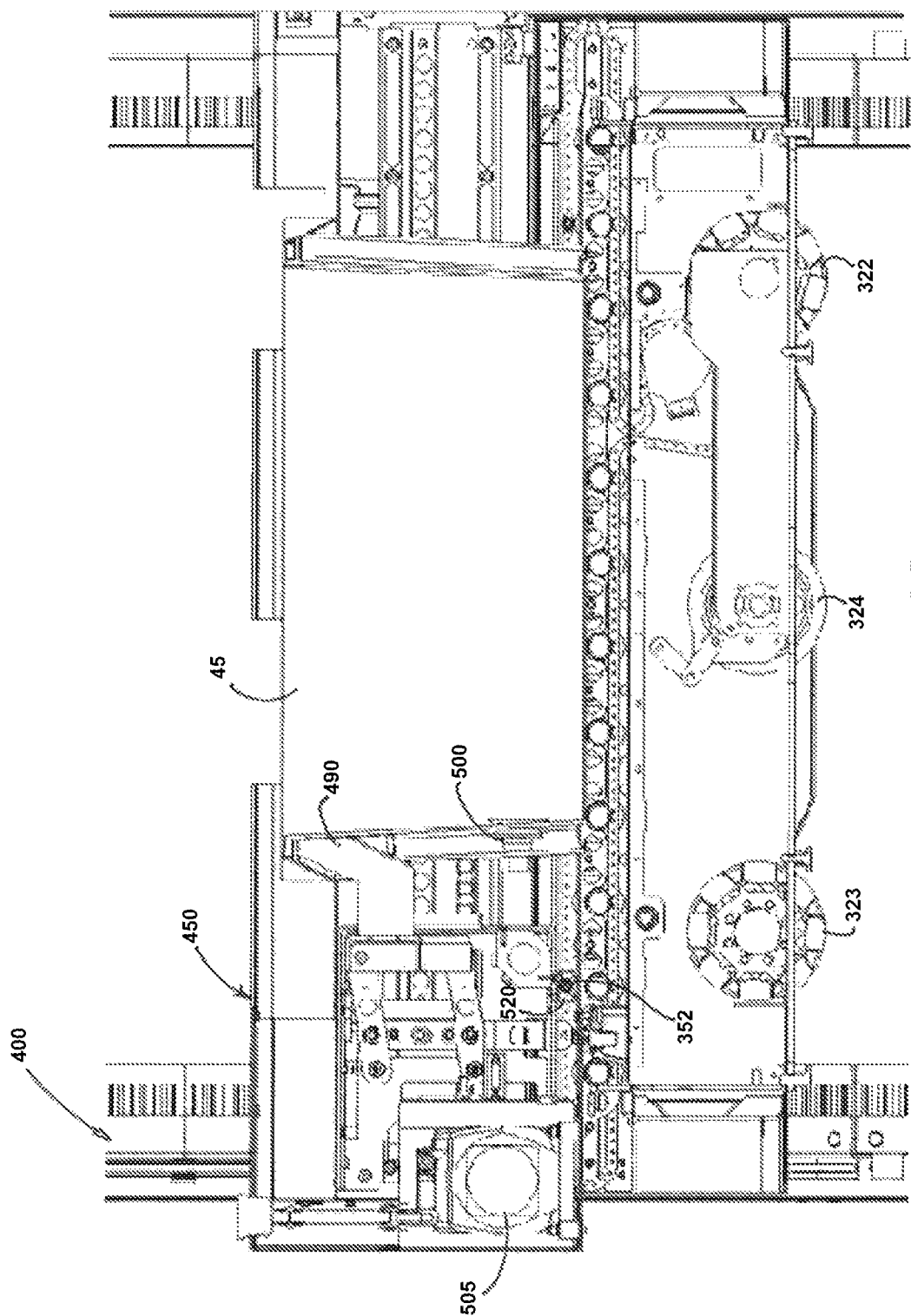
FIG. 26 is an enlarged fragmentary view of the retrieval system illustrated in FIG. 16.
Figure 27:
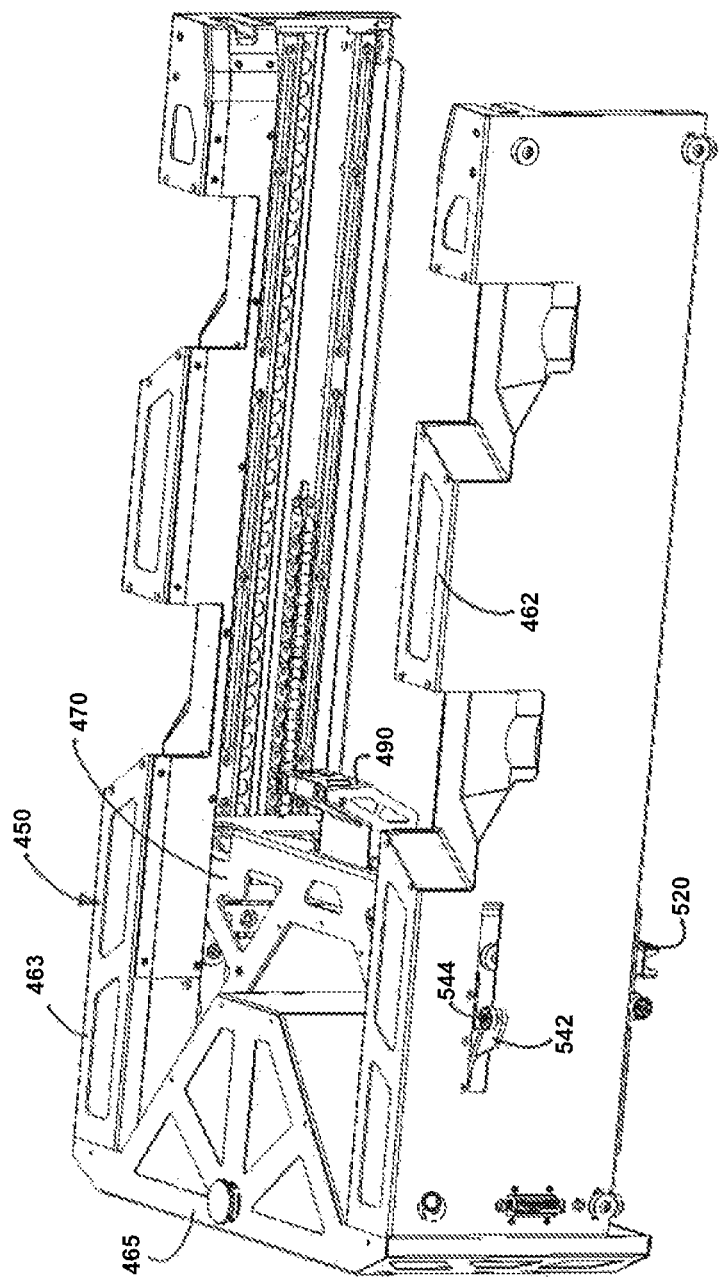
FIG. 27 is a perspective view of the carriage illustrated in FIG. 22.

The carriage 460 is positioned within the column 400 so that the channel is located vertically above the transfer pins 352 when the vehicle enters the retrieval column 400 as shown in FIGS. 23 and 25. When the vehicle drives upwardly to engage the transfer assembly 450, the transfer pins of the vehicle move into engagement with the channel 520 of the transfer head. Once the transfer pins 352 are positioned within the groove of the transfer head 470, driving the transfer mechanism 350 of the vehicle in a first direction drives the transfer head 470 toward the extended position and driving the transfer mechanism 350 of the vehicle in a second direction drives the transfer head toward the retracted position.

Figure 39:
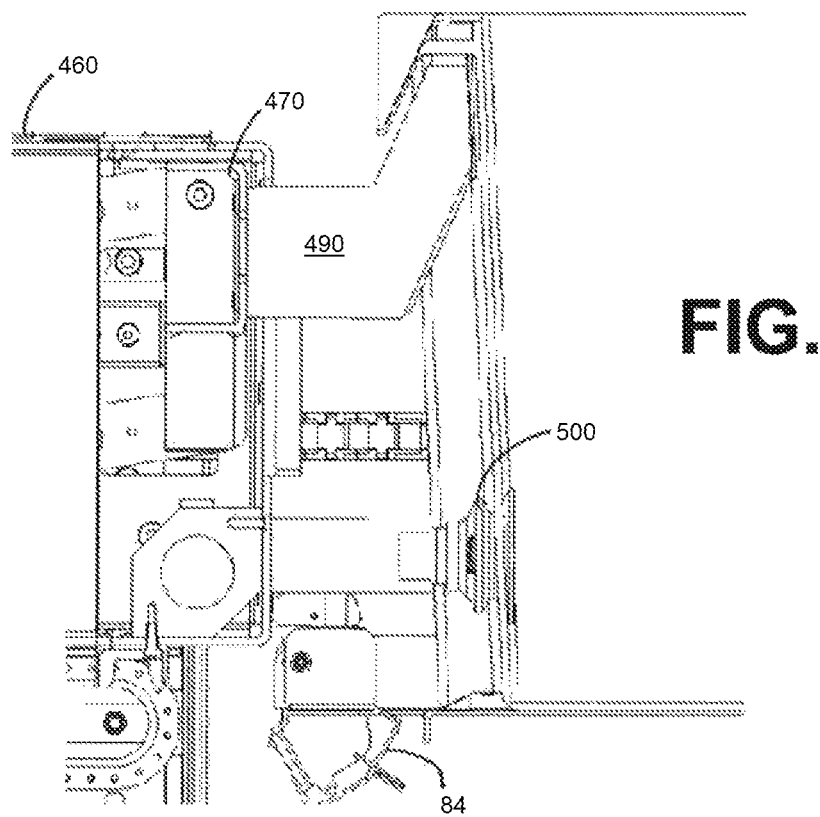
FIG. 39 is an enlarged fragmentary side view of the carriage illustrated in FIG. 22 in combination with a sortation location of the sortation system illustrated in FIG. 6.

The transfer head 470 may comprise one or more extraction mechanisms configured to engage and retain a bin to pull a bin onto the vehicle. One exemplary extraction mechanism comprises a moveable arm or latch 490 configured to engage a flange on the bin 45. For instance, the bin may include a handhold having a flange overlying a recess in the end of the bin. The latch 490 may be configured to be displaced upwardly into the handhold to latch onto the bin as shown in FIG. 39.

The latch 490 may be connected with a linkage for displacing the latch between an upward position and a lowered position. For instance, referring to FIG. 22, prior to the vehicle 310 engaging the transfer assembly 450, the latch 490 is shown in a lowered position. The latch 490 is connected with a four-bar linkage having an actuator link 494 that extends downwardly. When the vehicle 310 moves upwardly into engagement with the actuator link, the actuator link engages a surface of the vehicle so that the vehicle drives the actuator link upwardly. The four-bar linkage 492 is configured so that displacing the actuator link 494 upwardly displaces the latch 490 upwardly.

Alternatively or in addition to the latch 490, the transfer head may include one or more vacuum cups 500 for engaging the bins 45. Specifically, the vacuum cups may be connected with a pump 505. The vacuum cups 500 form a seal when they are pressed against the end wall of a bin 45 in a storage location 80. The vacuum pump applies a suction force to the vacuum cups so that the vacuum cups retain the bin.

Although the foregoing description describes a transfer head having two separate extraction mechanisms, it should be understood that the transfer head may include just a single extractor. Additionally, if desired, the transfer head may have any number of various extraction mechanisms.

The transfer head operates as follows, the retrieval vehicle 310 climbs vertically up the retrieval column to align the vehicle with the full bin that is to be retrieved. The transfer head 470 is actuated by driving the transfer mechanism 350 of the vehicle in a first direction, which in turn drives the transfer head along the length of the sidewalls 462, 463 of the carriage toward the extended position. In the extended position, the extraction mechanism 390, 500 engages the full bin 45. Once the extraction mechanism engages the bin, the transfer mechanism of the vehicle 350 is reversed to drive the transfer head toward the retracted position. As the transfer head moves to the retracted position, the transfer head pulls the full bin onto the retrieval vehicle.

The storage bins may be oriented at an angle relative to the horizon so that items move toward the front of the bin as the items are sorted into the bin. Accordingly, in order to ensure that the bins do not fall off the storage location, the storage location may include a bin retainer for retaining the bin in the storage location.

Referring to FIGS. 36-40C, the storage location 80 may be in the form of a planar surface such as a shelf 82. The shelf may be angled downwardly relative to the horizon. A displaceable stop 84 may be positioned at the front end of the shelf to impede movement of the bin off of the shelf. In this way, the stop prevents the bin from inadvertently falling off the front edge of the shelf.

The stop 84 is displaceable between a raised position and a lowered position. In the raised position the stop engages the bin to impede movement of the bin relative to the shelf. In the lowered position the bin is free to move along the shelf.

The stop may be a simple lever, however in the present instance, the stop 84 is a compound mechanism having an actuator arm connected with the stop 84. The actuator arm 90 is pivotable about a pivot axis and has a first end 92 configured to engage the transfer head to actuate the stop 84. The actuator arm 90 has a second end 94 having a flange configured to engage the stop 84. The stop 84 may be a pivotable arm that extends across the width of the shelf 82. The stop 84 may have an extension that projects downwardly forming a first engagement surface 87 and a second engagement surface 88. Additionally, the stop may pivot about pivot axis 95. Further, a plurality of biasing elements may bias the stop toward the raised position.

Figure 40A:
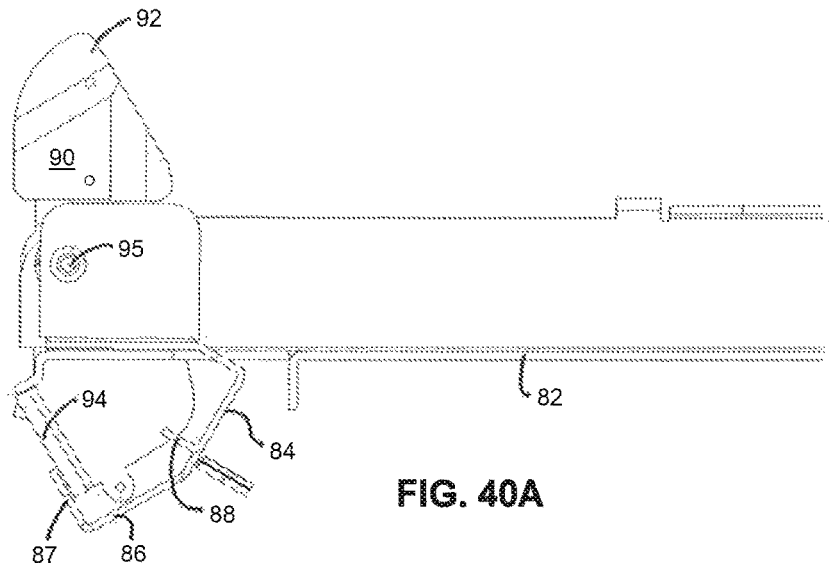
FIG. 40A is a side elevation view of the retainer illustrated in FIG. 37 with the retainer in an open position.
Figure 40B:
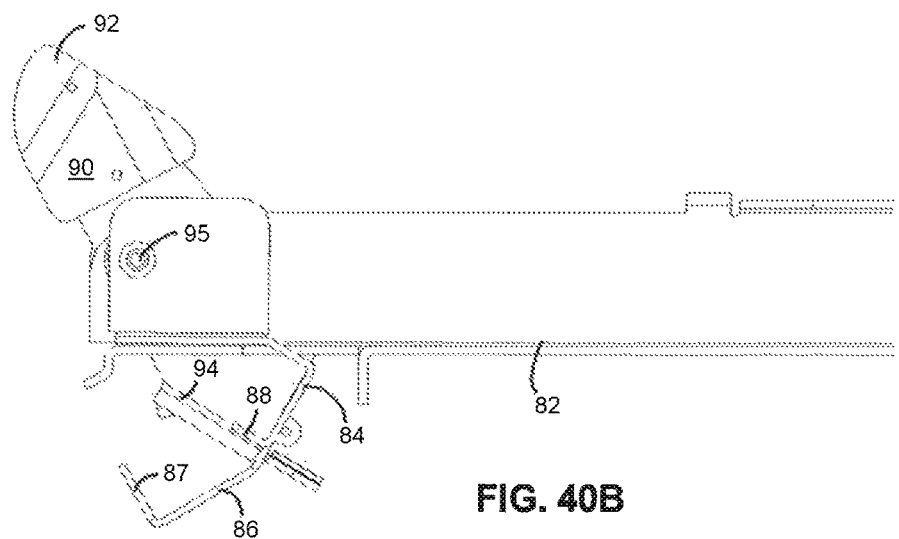
FIG. 40B is a side elevation view of the retainer illustrated in FIG. 40A with the retainer in an actuated position.
Figure 40C:
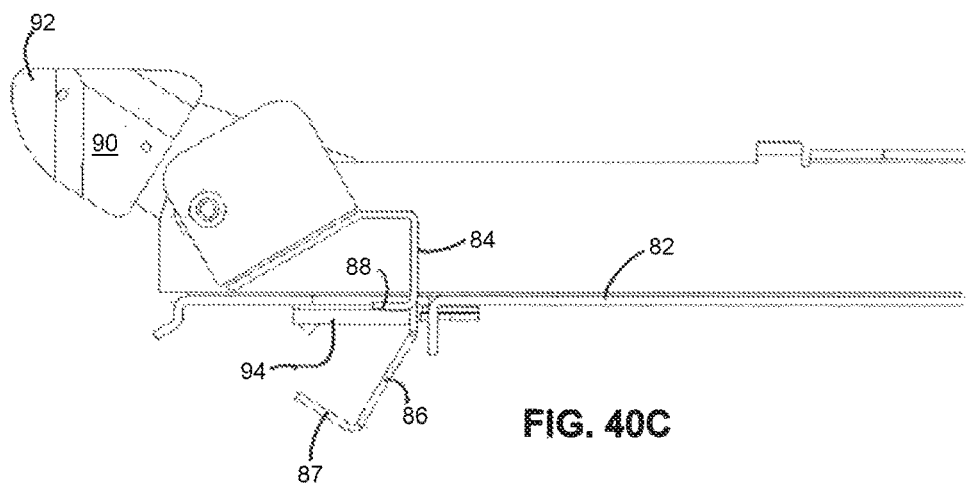
FIG. 40C is a side elevation view of the retainer illustrated in FIG. 40A with the retainer in a closed position.

Referring to FIGS. 38 and 40A-40C, the operation of the stop will be described. As the transfer head 470 is displaced toward the extended position, an actuation surface, such as the face of the transfer head 472, engages the actuation arm 90 of the stop. The transfer head 470 displaces the actuation arms from a first position shown in FIG. 40C to a second position shown in FIG. 40A. As the actuator arm is displaced from the first to the second position, the second end of the actuator arm engages the first engagement surface 87 of the stop arm 84 to drive the stop into the lowered position as shown in FIG. 40A. Once the stop is lowered, the transfer head 470 pulls the bin onto the vehicle 310 as discussed above. As the transfer head 470 moves away from the storage location, the face of the transfer head disengages the actuator arm 90. Biasing elements bias the actuator arm toward the first position, so that the second end of the actuator arm engages the second engagement surface or flange 88 of the stop to drive the stop as shown in FIG. 40B into the raised position as shown in FIG. 40C.

In this way, in addition to extending to engage a bin in the storage location, the transfer head is operable to actuate a stop to release the bin from the storage location.

Figure 5:
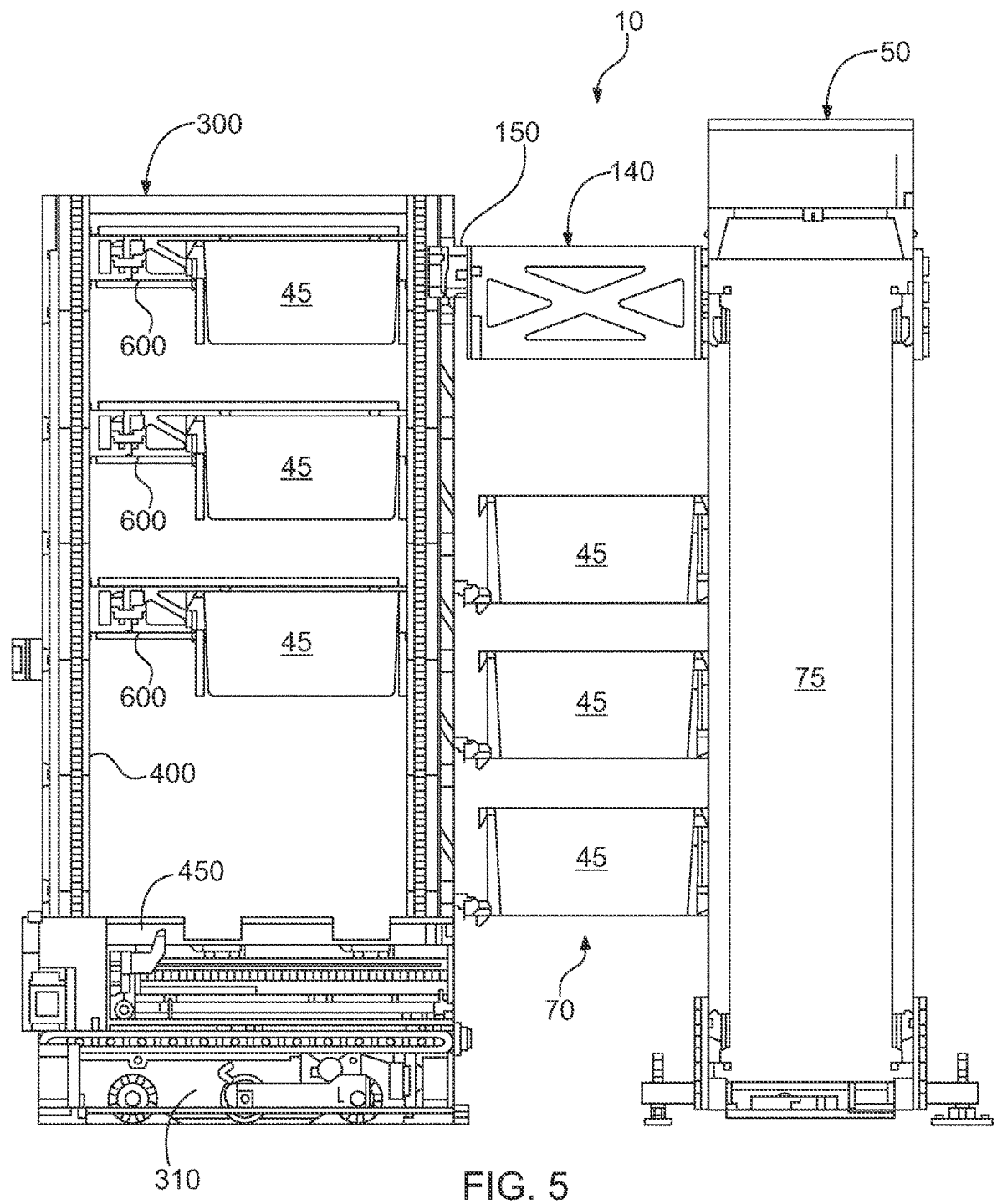
FIG. 5 is a side view of the material handling system illustrated in FIG. 3.

It may be desirable to retrieve a plurality of full bins and store the bins in the retrieval column and then deliver all of the full bins at once by driving the column to an input/output station. Accordingly, referring to FIGS. 5 and 41-43C, the system may include a bin retainer 600 for retaining bins in the retrieval column. Specifically, the bin retainer may include a plurality of paddles or fingers 610, 612 displaceable between a retracted position and an extended position. In the retracted position the paddles are retracted out of engagement with the bins. In the extended position as shown in FIG. 5 the paddles form a ledge under the lip or flange that extends outwardly from the top rim of the bin. In this way, the paddles hold the bin up in the column so that the vehicle can retrieve a bin, raise the bin up in the column so that the bin retainer retains the bin. Then the vehicle can lower down to release the bin so that the vehicle can retrieve another bin.

Figure 41:
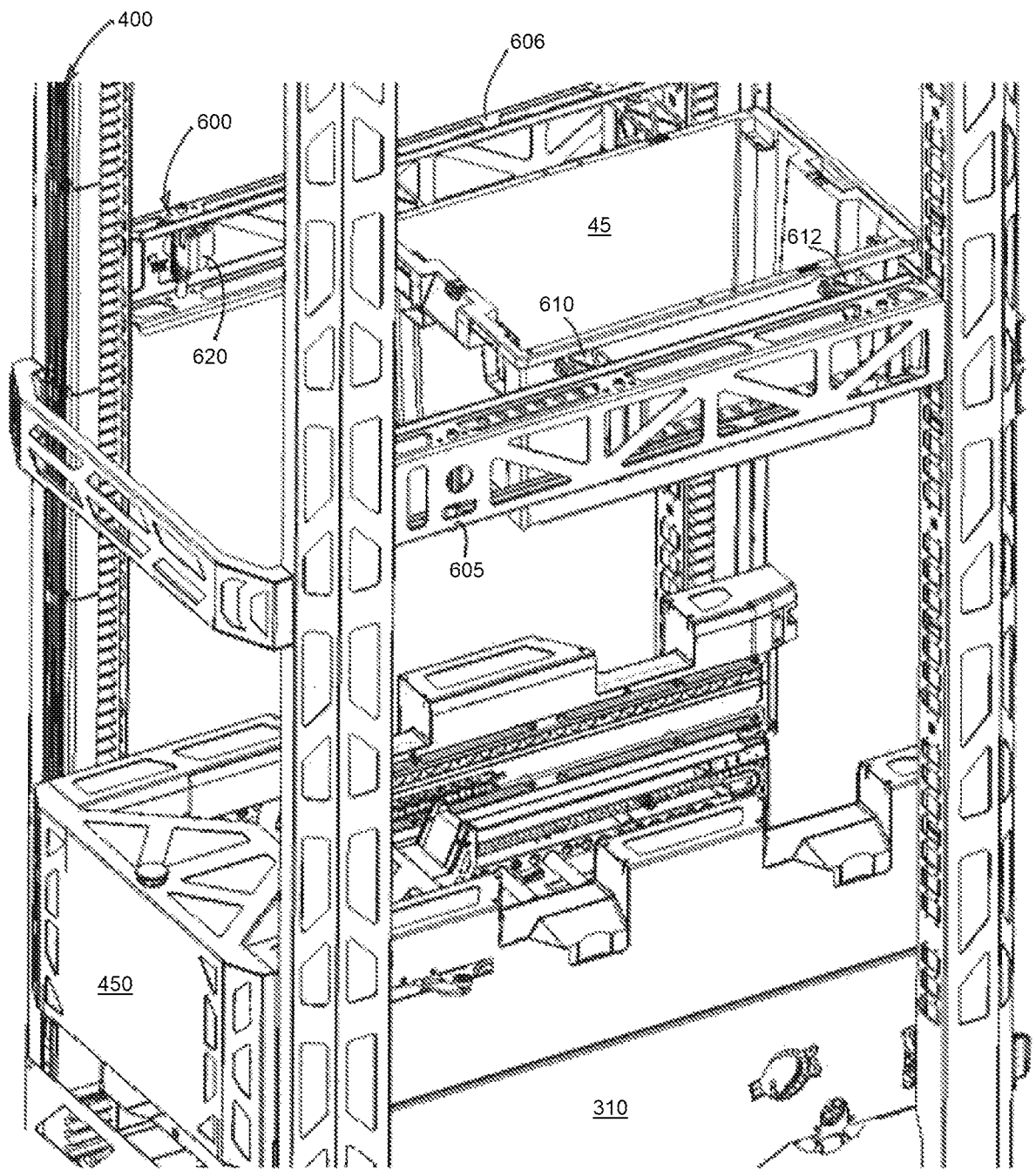
FIG. 41 is a fragmentary perspective view of the retrieval system illustrated in FIG. 16 in combination with a bin retainer.
Figure 42:
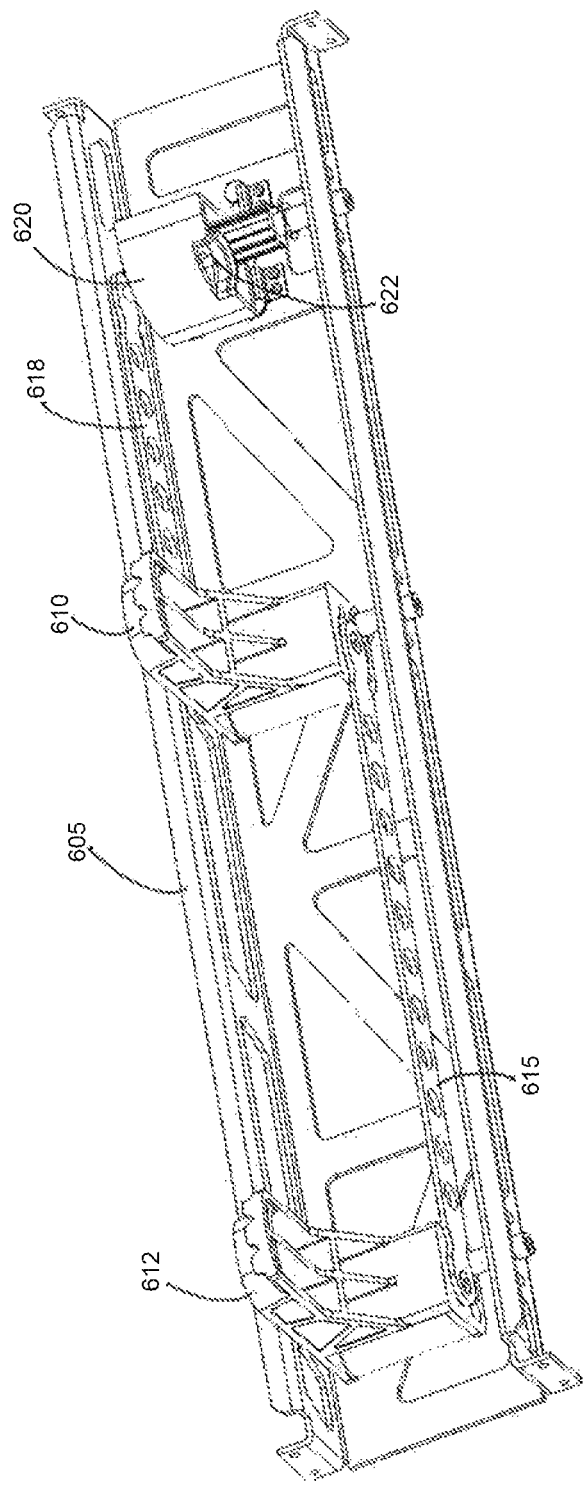
FIG. 42 is a perspective view of a portion of the bin retainer illustrated in FIG. 41.

The bin retainer 600 includes a pair of sides 605 and 606 on opposite sides of the column 400 as shown in FIG. 41. The first and second sides 605, 606 are substantially mirrors of one another. The first side is illustrated in FIG. 42. As shown in FIG. 42, a connecting arm 615 connects the first paddle 610 with the second paddle. Additionally, a drive arm 618 connected the first paddle 610 with an actuator 620. The actuator 620 includes a recess or pocket for engagement with an actuator 540 on the transfer head 470.

Figure 43C:
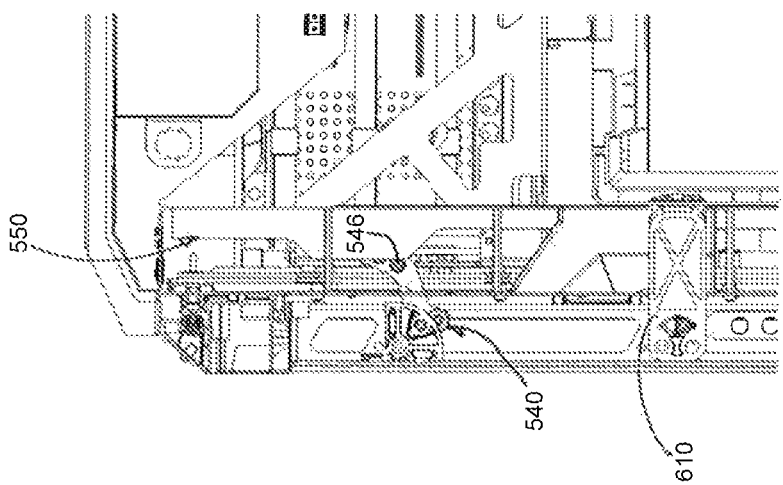
FIG. 43C is an enlarged fragmentary plan view, partially broken away, of the retrieval system illustrated in FIG. 43A with the bin retainer in an actuated position.
Figure 43B:
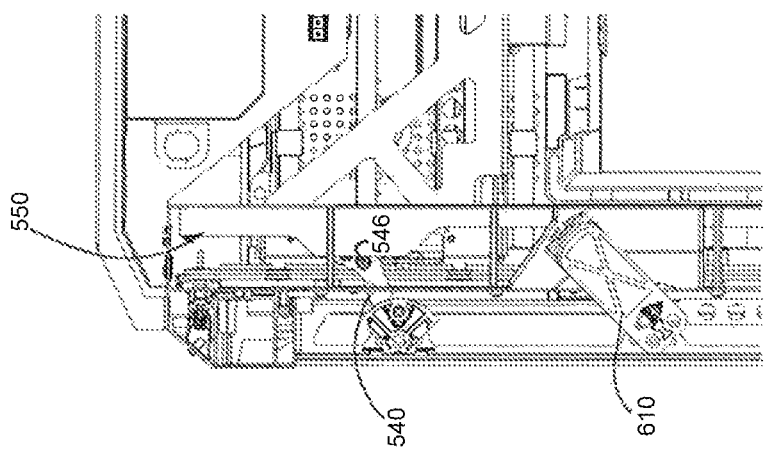
FIG. 43B is an enlarged fragmentary plan view, partially broken away, of the retrieval system illustrated in FIG. 43A with the bin retainer in a partially actuated position.
Figure 43A:
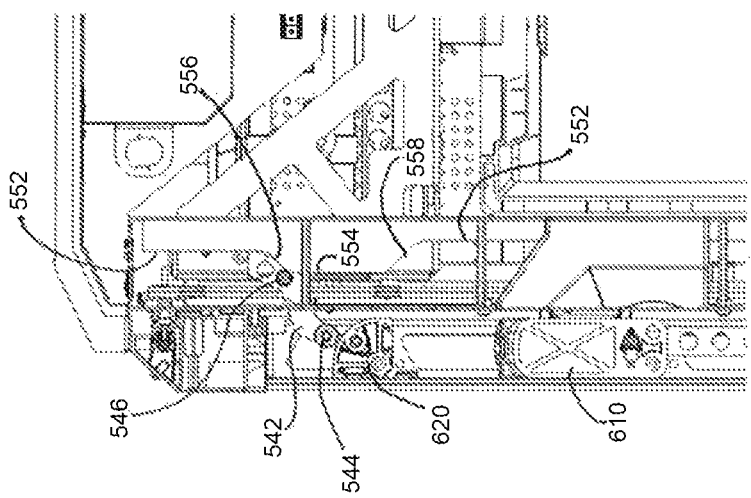
FIG. 43A is an enlarged fragmentary plan view, partially broken away, of the retrieval system illustrated in FIG. 41 with the bin retainer in an unlatched position.

Referring to FIGS. 43A-43C, the bin retainer actuator 540 includes a pivotable arm 542 having a roller on a distal end 544 that engages the bin retainer actuator 620. The actuator arm 542 also includes follower roller 546 configured to follow a surface profile to extend and retract the arm. Specifically, as shown in FIGS. 43A-C, the follower 546 follows a cam surface 550 having a retracted surface 552, an extended surface 554, an angled extension surface 556 and an angled retraction surface 558. As the transfer head 470 is displaced from the retracted position to the extended position, the bin retainer actuator 540 is actuated to extend the arm outwardly to actuate the paddles to rotate the paddles 610, 612 from the retracted position to the extended position.

In the foregoing description, the retrieval system 300 is described as being used to retrieve full bins 45 from a sorting system 50. Additionally, the retrieval system may be used to manipulate bins that are not full. For instance, it may be desirable to shake a bin to settle items in the bin to provide more room for receiving additional items. An operation similar to the process of retrieving the full bins can be used to shake the bin. Specifically, the retrieval vehicle can be driven adjacent to a bin that is identified as needing to be shaken. The transfer mechanism that is operable to engage the full bin and transfer the full bin onto the retrieval system may engage the bin and shake it rather than loading the bin onto the retrieval system.

The retrieval system may shake the bin by extending the carriage 460 into engagement with the bin identified as needing to be shaken. The carriage is then retracted while engaging the bin to pull the bin toward the retrieval vehicle 310. The carriage is the extended again to push the bin toward the storage location. When the carriage is retracted it is not completely retracted so that the bin is pulled onto the retrieval vehicle. In particular, the distance that the carriage is retracted is less than the length of the bin. In this way, the bin is not pulled all the way out of the storage location when it is shaken. Additionally, if the storage location includes a retainer 84 for retaining the bin, the bin remains in the open position while the bin is shaken.

As described above, the bin may be shaken by displacing the carriage back and forth. Preferably, to settle the contents in the bin, the carriage repeatedly retracts and extends to repeatedly move the bin forward and backward. Additionally, during the shaking process, the carriage may be driven forwardly at a faster rate than the rate the carriage is retracted. In this way the items in the bin will tend to be shaken toward the front of the bin to provide more room at the back of the bin for receiving items.

Method of Operation

Configured as discussed above, the system is operable to automatically retrieve items from a plurality of bins. The method may optionally include the steps of automatically sorting a plurality of items into a plurality of bins. The step of sorting the items may include any of a variety of methodologies. For instance, the step of sorting may include the step of sorting a plurality of items into a rack of bins in a plurality of storage locations. The bins may be arranged in a plurality of rows or columns.

The step of sorting may optionally include the step of serially feeding a plurality of items to a plurality of delivery vehicles. The delivery vehicles may deliver the items to the bins to accumulate items into the different bins. For instance, each bin may be associated with a particular order so that the vehicles deliver items to a bin until all of the items for the order associated with a bin are delivered. Once a bin has received all of the items that are to be delivered to the bin, the bin is identified as full. Alternatively, if enough items are delivered to the bin to fill the bin, the bin may be identified as full. Accordingly, it should be noted that a bin identified as being full does not mean that the entire volume of the bin is filled with items. Rather, a bin may be identified as full when all of the items for the bin (e.g. all of the items for an order) are delivered to the bin. Further, it should be understood that the items in an order to not necessary mean an individual customer order. An order may indicate any grouping of items as identified by a control system. For example, a central warehouse may provide a supply of items to a number of retails stores. The items may be sorted into orders that represent different areas or aisles of each store. In this way, an order may represent a group of items to be sent to a particular aisle of a particular store. It should also be understood that a particular order may require more than one bin so that a plurality of separate bins may be associated with a single order. Accordingly, it should be understood that the term order is meant to include any grouping of one or more items associated with a particular bin or set of bins.

In this way, the method may include the step of identifying a bin or set of bins for an order as being full. Once a bin is identified as being full, the bin may be automatically retrieved and conveyed away from the sorting area. For instance, the step of removing the full bin may include the step of retrieving the full bin from a rack of bins and conveying the full bin away from the rack. Additionally, the method may include the step of placing an empty bin into the storage location in the rack from which the full bin was retrieved.

The method may include the step of controlling the sorting process to prevent items from being delivered to the storage location having a full bin. Additionally, the method may optionally include the step of controlling the sorting process to prevent items from being sorted to a storage location when a bin has been removed from the storage location. Further, the method may optionally include the steps of resuming sorting items to a storage location once an empty bin has been delivered to the empty storage location.

Additionally, the method of sorting may optionally include the step of continuing to deliver items to bins that are not full during the step of removing a full bin.

The step of removing a full bin may include the step of moving a retrieval device to position the retrieval device adjacent the full bin. Optionally, the step of moving a retrieval device may include the step of lifting a vertical track and moving the raised track.

The optional step of lifting the vertical track may include the step of lifting the vertical track by a retrieval vehicle configured to drive along the floor. The step of moving the retrieval device may also include the step of driving the retrieval vehicle along the ground.

The step of removing a full bin may also include the step of driving a retrieval vehicle vertically and driving a transfer mechanism to engage the full bin and transfer the full bin out of the storage location and onto the storage vehicle.

Optionally the step of driving a transfer mechanism includes the step of connecting the retrieval vehicle with a displaceable carriage configured to engage the full bin. Once the displaceable carriage is connected with the retrieval vehicle, a drive element of the retrieval vehicle may be actuated to extend the carriage away from the retrieval vehicle into engagement with the full bin. The step of driving a transfer mechanism may also include the step of reversing the drive element of the retrieval vehicle to retract the carriage back toward the delivery vehicle along with the full bin.

After the step of retrieving the full bin, the method includes the step of displacing the full bin away from the storage location from which the bin was removed. The step of displacing the full bin may include the step of driving the retrieval vehicle downwardly and then driving the retrieval vehicle along a vertical path, such as the floor, to a separate area. For instance, the step of displacing a full bin may include the step of displacing the full bin to an output conveyor configured to receive bins and convey the bins to a separate area for processing the full bins. Optionally, the step of displacing the full bin comprises the step of raising the vertical track to move the vertical track along with the full bin. Alternatively, the step of displacing the full bin may comprise the step of driving the retrieval vehicle away from the vertical track.

Optionally, the step of retrieving the full bin may include the step of engaging a bin retainer that is configured to retain the full bin in the storage location. Additionally, the method may include the step of displacing the retainer to release the bin and displacing the bin from the storage location while the retainer is displaced.

Optionally, the method may also include the step of retrieving a plurality of full bins and storing the retrieved bins on the retrieval system. The step of retrieving a plurality of bins may include the step of retrieving a first bin and displacing the first bin upwardly into a storage location in the retrieval system and retaining the first bin in the storage location in the retrieval system. While the first bin is retained in the storage location in the retrieval system, the retrieval system may retrieve a second full bin and transfer the second full bin onto the retrieval system.

After the step of retrieving a second full bin, the method may include the step of simultaneously displacing both the first and second full bins away from the sorting system.

If the method includes the step of retrieving a plurality of full bins and storing the retrieved bins on the retrieval system may include the steps of determining the order for which the plurality of bins are to be retrieved. The step of determining the order may comprise identifying the bin in the sort rack that is positioned the highest in the rack and prioritizing that bin as the first bin to be retrieved. The step of determining the order may also comprise the step of identifying a second full bin that is positioned lower than the first bin. The step of determining the order may also comprise the step of identifying a third full bin that is positioned lower than the second full bin.

The method may also include the step of selectively placing empty bins into storage locations. Specifically, the method may include the step of identifying storage locations that are empty. The retrieval system may be loaded with one or more empty bins. For instance, the retrieval system may retrieve and store one or more empty bins on the retrieval system.

The retrieval system may be conveyed to a location adjacent a storage location that has been identified as being empty. In particular, the retrieval system may receive signals from a controller identifying a path to the storage location that has been identified as being empty. Once the retrieval system is positioned adjacent a storage location that is identified as empty, the retrieval system may transfer an empty container into the storage location identified as empty.

The step of selectively placing bins in empty storage locations may include the step of storing a plurality of empty bins on the retrieval system. Additionally, the method may include the steps of determining the order for which the empty storage locations are to receive an empty bin. The step of determining the order may comprise identifying the storage location in the sort rack that is positioned the lowest in the rack and prioritizing that storage location as the first storage location to receive an empty bin from the retrieval system. The step of determining the order may also comprise the step of identifying a second empty storage location that is positioned higher than the first empty storage location. The step of determining the order may also comprise the step of identifying a third empty storage location that is positioned higher than the second empty storage location. The retrieval system may then transfer empty bins into the empty storage locations in the determined order.

A described above, the retrieval system 300 may be incorporated into a material handling system 10 and the material handling system may be part of an overall automated warehouse system 5. The central controller may be part of a warehouse management system that includes software for tracking items and determining which items are needed for which orders and for scheduling which orders are to be processed by which system 10.

As noted above, a bin may be identified as being full when the system 10 determines that all of the items for an order have been sorted to the bin. Additionally, a bin may be full if it is sufficiently full that it does not have room to receive an item. The system may have one or more sensors for determining whether a bin is full because it cannot receive another item. For instance, the sorting system 50 may include a plurality of delivery vehicles as discussed above.

The delivery vehicles may include sensors that sense whether an item is transferred from the delivery vehicle to the bin. If a bin is full, the items in the bin will block the transfer of an item from the delivery vehicle. Accordingly, the delivery vehicle will attempt to transfer the item, but sensor will indicate that the item is still on the delivery vehicle because of the blockage. Accordingly, if the delivery vehicle attempts to deliver an item but is unable to transfer the item to the bin, the system may declare that the bin is full and in need of being retrieved. The delivery vehicle will then receive signals to delivery the item to a different location.

In some instances, the items in a bin may block additional items from being sorted to the bin even though the bin is sufficiently empty to receive additional items. Specifically, the items for an order may have a variety of shapes and sizes. As the various items are delivered to the bin the items may stack irregularly in a way that creates a large amount of empty space under the items. Frequently, this problem can be corrected by shaking the bin to cause the items in the bin to settle and take up less space. Accordingly, the system may include a method for selectively shaking bins to settle the items in the bin.

The method for selectively shaking a bin includes the step of sorting a plurality of items to a bin. The method may also include the step of identifying that a bin needs to be shaken. The step of identifying may include the step of detecting whether an item in unable to be transferred into the bin.

The method of shaking the bin comprises the step of moving transfer mechanism into engagement with a bin that is identified as needing to be shaken. The transfer mechanism is then moved into engagement with the identified bin. The transfer mechanism may then shake the bin by displacing the bin away from storage location and then back toward the storage location. The step of displacing the bin away from the storage location and then back toward the storage location may be repeated a number of times. After the step of shaking the bin, the transfer mechanism disengages the bin and moves away from the bin.

After the step of shaking the bin, the method may include the steps of delivering one or more additional items to the bin.

As noted above, the process of identifying that a bin needs to be shaken may include the step of determining detecting that an item is unable to be transferred into the bin. Alternatively, the step of determining whether a bin needs to be shaken may be determined based upon data regarding the volume of items that have been delivered to the bin. As noted above, a central controller may provide the sorting system with a list of items for an order. The central controller may include data for each item being sorted, including volumetric information for each item. Accordingly, the central controller may track each item delivered to a bin and by doing so, the total volume for all of the items delivered to a bin can be tracked by the central controller. Therefore, the system can determine that a bin should be shaken if the total volume of items that have been delivered to a bin exceeds a threshold.

Additionally, the process for identifying that a bin should be shaken may include a combination of an analysis of the volume of the items delivered to the bin in combination with a separate signal indicative of the bin being too full to receive an item. For example, as described above, if a delivery vehicle attempts to deliver an item to the bin but is unable to transfer the item into the bin, the failure to unload the item may be a jam or it may be caused by a blockage from items in the bin. Specifically, if the delivery vehicle attempts to deliver an item but a sensor on the delivery vehicle indicates that the item remains on the delivery vehicle, then the delivery vehicle sends a signal to the central controller indicating that the item was not delivered. The central controller can then determine if the volume of the items already delivered to the bin exceeds a predetermined limit, such a percentage of the volume of the bin. If the volume exceeds the limit then the central controller may determine that the bin is full and provide a signal that the bin should be retrieved. In response, the retrieval system 300 may be controlled to retrieve the full bin. Alternatively, if the central controller determines that the volume of items in the bin is below the threshold then then central controller may identify the bin as needing to be shaken. The central controller may then send a signal to the retrieval system indicating that the bin should be shaken.

Optionally, if the bin is identified as needing to be shaken, the delivery vehicle that attempted to deliver an item to the bin may remain at the storage location where the bin is located. After the bin is shaken, the delivery vehicle may then attempt to deliver the item into the bin. If the delivery vehicle is unable to deliver the item, the system may declare a jam. Alternatively, the delivery vehicle may be driven away from the bin to a rejected bin to reject the item into the reject bin.

In addition to the process for automatically identifying and shaking bins, it should be understood that a variety of criteria can be used to identify a bin as needing to be shaken. For instance, in some situation, the sorting system may end after a shift without completing all of the order and without retrieving all of the bins that have items in them. Prior to restarting the sorting process, the central controller may identify every bin that has items in it so that such bins can be shaken to settle the items. Similarly, the system may identify bins having a certain volume of items and identifying such bins as needing to be shaken before restating the sorting process.

It should be understood that the method of shaking the bins may be performed separate from the process of sorting items and retrieving full bins described above. Alternatively, the process of shaking bins may be incorporated into a process of sorting items to bins and retrieving full bins once the bin is full.

The order of methods described herein may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Accordingly, while the foregoing is directed to embodiments of the present invention, other and further embodiments of the invention may be devised without departing from the basic scope thereof, and the scope thereof is determined by the claims that follow.

We claim:

1. A material handling system cooperable with a storage assembly having a plurality of storage locations for storing a plurality of items, comprising:
 a vehicle for conveying items, comprising:
  a horizontal drive assembly configured to drive the vehicle horizontally along a horizontal surface;
  a vertical drive assembly configured to drive the vehicle vertically upwardly;
  a power source for powering the horizontal drive assembly and the vertical drive assembly;
 a moveable track on the horizontal surface, comprising:
  a vertical track cooperable with the vertical drive assembly of the vehicle;
  wherein the moveable track comprises an opening configured to receive at least a portion of the vehicle;
 a carriage disposed within the moveable track and cooperable with the vehicle, wherein the carriage is configured to transfer items from the storage locations onto the vehicle while the vehicle is disposed within the track and wherein the power source of the vehicle is operable to power the carriage;
 wherein the vertical drive assembly is configured to engage the vertical track;
 wherein the vertical drive assembly is engageable with the vertical track and: (a) the vertical drive is driveable in a first direction to raise the moveable track off the horizontal surface and (b) the vertical drive assembly is driveable in a second direction to drive the vehicle up the vertical track to an elevated position to facilitate transfer of an item between a storage location and the vehicle.

2. The system of claim 1 wherein the moveable track comprises a support structure configured to support the vertical track in a vertical orientation.

3. The system of claim 2 wherein the support structure is configured to support the vehicle when the vehicle is in the elevated position on the vertical track.

4. The system of claim 3 wherein the support structure comprises a frame forming a column having an opening configured to receive the vehicle.

5. The system of claim 4 wherein the vertical drive projects outwardly from the vehicle and the support structure comprises gaps configured to align with the vertical drive assembly to facilitate the vehicle driving into the support structure.

6. The system of claim 2 wherein the moveable track comprises a connector for releasably connecting the moveable track with the storage assembly.

7. The system of claim 6 wherein the storage assembly comprises a fixed rack having a connector configured to releasably connect with the connector on the moveable track.

8. The system of claim 7 wherein the moveable track connector is configured to impede displacement of the moveable track relative to the storage assembly along at least one horizontal axis.

9. The system of claim 8 wherein the moveable track connector is configured so that relative vertical displacement between the moveable track and the storage assembly connects the connector with the storage assembly.

10. The system of claim 1 wherein the vertical drive assembly is configured to maintain the orientation of the vehicle relative to the horizon as the vehicle is driven upwardly.

11. The system of claim 1 wherein the vertical track comprises a plurality of track sections extending vertically upwardly and the vertical drive assembly comprises a plurality of vertical drive elements interconnected so that operating the vertical drive assembly synchronously drives the vehicle up the track sections to maintain the horizontal orientation of the vehicle.

12. The system of claim 1 wherein the vehicle comprises a transfer mechanism for loading items onto the vehicle or discharging items from the vehicle.

13. The system of claim 12 wherein the carriage is configured to cooperate with the transfer assembly so that driving the transfer mechanism in a first direction extends the carriage toward one of the storage locations and driving the transfer mechanism in a second direction retracts the carriage toward the vehicle.

14. The system of claim 12 wherein the transfer mechanism is connected with the horizontal drive assembly.

15. The system of claim 1 wherein a plurality of the sort locations comprise a retainer for retaining items in the sort locations wherein the carriage comprises a release mechanism configured to release the retainer to permit the carriage to withdraw the item from the sort location.

16. The system of claim 1 wherein the storage locations are configured to receive containers that are configured to receive the items and wherein the moveable track comprises a container location for storing one or more containers.

17. The system of claim 16 wherein the moveable track comprises a releasable retainer operable to releasably retain a container in the container location.

18. The system of claim 17 wherein the carriage is configured to cooperate with the moveable track to displace a container into the container location.

19. The system of claim 18 wherein the carriage is operable to release the container into the container location and retrieve another container from one of the storage locations.

* * * * *